(12) United States Patent
Sureka et al.

(10) Patent No.: US 12,541,989 B2
(45) Date of Patent: Feb. 3, 2026

(54) MACHINE-LEARNING MODELS FOR IMAGE PROCESSING

(71) Applicant: Citibank, N.A., New York, NY (US)

(72) Inventors: Ashutosh K. Sureka, Irving, TX (US); Venkata Sesha Kiran Kumar Adimatyam, Irving, TX (US); Miriam Silver, Tel Aviv (IL); Daniel Funken, Irving, TX (US); Toan Pham, Irving, TX (US); Vicky Kapadia, Irving, TX (US); Sakthivel Palanivel, Irving, TX (US); Anurag Bhakoo, Irving, TX (US)

(73) Assignee: Citibank, N.A., New York, NY (US)

(*) Notice: Subject to any disclaimer, the term of this patent is extended or adjusted under 35 U.S.C. 154(b) by 0 days.

(21) Appl. No.: 19/217,047

(22) Filed: May 23, 2025

(65) Prior Publication Data

US 2025/0316104 A1    Oct. 9, 2025

Related U.S. Application Data

(63) Continuation-in-part of application No. 18/943,672, filed on Nov. 11, 2024, now Pat. No. 12,347,221,
(Continued)

(51) Int. Cl.
*G06K 9/00* (2022.01)
*G06T 7/13* (2017.01)
(Continued)

(52) U.S. Cl.
CPC ............. *G06V 30/40* (2022.01); *G06T 7/13* (2017.01); *G06T 7/60* (2013.01); *G06V 10/44* (2022.01);
(Continued)

(58) Field of Classification Search
None
See application file for complete search history.

(56) References Cited

U.S. PATENT DOCUMENTS

| | | | |
|---|---|---|---|
| 8,688,579 B1 | 4/2014 | Ethington et al. | |
| 9,137,417 B2 | 9/2015 | Macciola et al. | |

(Continued)

FOREIGN PATENT DOCUMENTS

CA    3188665 A1    3/2024

OTHER PUBLICATIONS

Chernov, Timofey S., Sergey Allyuhin, and Vladimir V. Arlazarov. "Application of dynamic saliency maps to the video stream recognition systems with image quality assessment." Eleventh International Conference on Machine Vision (ICMV 2018). vol. 11041. SPIE, 2019. (Year: 2018).

(Continued)

*Primary Examiner* — SJ Park
(74) *Attorney, Agent, or Firm* — Foley & Lardner LLP

(57) ABSTRACT

Presented herein are systems and methods for the employment of machine learning models for image processing. A mobile application for client-side image processing and validation, which interacts with and leverages native image processing software of the client device, where the image processing software and the mobile application include any number of machine-learning models for identifying a document and attributes of the document for recognition and validation. This mobile application uses the image processing software from a client operating system to control the camera. The image processing software generates various types of information about a video frame and the document, and the mobile application invokes APIs or software libraries of the image processing software to access the information and validate the frame and document.

20 Claims, 19 Drawing Sheets

Related U.S. Application Data which is a continuation-in-part of application No. 18/629,259, filed on Apr. 8, 2024, now Pat. No. 12,266,145.

(51) Int. Cl.
*G06T 7/60* (2017.01)
*G06V 10/44* (2022.01)
*G06V 10/60* (2022.01)
*G06V 20/00* (2022.01)
*G06V 30/40* (2022.01)
*H04L 9/40* (2022.01)
*G06V 10/70* (2022.01)

(52) U.S. Cl.
CPC .............. *G06V 10/60* (2022.01); *G06V 20/95* (2022.01); *H04L 63/0428* (2013.01); *G06T 2207/10016* (2013.01); *G06T 2207/20081* (2013.01); *G06T 2207/20164* (2013.01); *G06T 2207/30176* (2013.01); *G06V 10/70* (2022.01)

(56) References Cited

U.S. PATENT DOCUMENTS

| | | | |
|---|---|---|---|
| 9,449,312 | B1 | 9/2016 | Wilson et al. |
| 9,672,510 | B2 | 6/2017 | Roach et al. |
| 10,019,772 | B1 | 7/2018 | Smith |
| 10,115,031 | B1 | 10/2018 | Pashinstev et al. |
| 10,339,374 | B1 | 7/2019 | Pribble et al. |
| 10,635,898 | B1 | 4/2020 | Pribble |
| 10,803,431 | B2 | 10/2020 | Hinski |
| 10,867,171 | B1 | 12/2020 | Contryman et al. |
| 10,970,550 | B1 | 4/2021 | Goldberg et al. |
| 11,068,976 | B1 | 7/2021 | Voutour et al. |
| 11,176,423 | B2 | 11/2021 | Desai et al. |
| 11,321,679 | B1 | 5/2022 | Bueche et al. |
| 11,900,755 | B1 * | 2/2024 | Bueche, Jr. ............. G06T 7/194 |
| 11,978,271 | B1 | 5/2024 | Kharbanda et al. |
| 12,039,504 | B1 | 7/2024 | Foster et al. |
| 12,056,434 | B2 | 8/2024 | Bhatia et al. |
| 12,106,590 | B1 | 10/2024 | Kinsey |
| 12,272,111 | B1 | 4/2025 | Sureka et al. |
| 12,387,512 | B1 | 8/2025 | Sureka et al. |
| 2007/0233615 | A1 | 10/2007 | Tumminaro |
| 2011/0091092 | A1 | 4/2011 | Nepomniachtchi et al. |
| 2011/0243459 | A1 | 10/2011 | Deng |
| 2012/0230577 | A1 | 9/2012 | Calman et al. |
| 2013/0022231 | A1 * | 1/2013 | Nepomniachtchi .. G06Q 20/387 382/229 |
| 2013/0070847 | A1 | 3/2013 | Oami et al. |
| 2014/0270464 | A1 | 9/2014 | Nepomniachtchi et al. |
| 2015/0003666 | A1 | 1/2015 | Wang et al. |
| 2015/0032631 | A1 | 1/2015 | Hinski |
| 2015/0063653 | A1 | 3/2015 | Madhani et al. |
| 2015/0120572 | A1 | 4/2015 | Slade |
| 2015/0278819 | A1 | 10/2015 | Song et al. |
| 2015/0294523 | A1 | 10/2015 | Smith |
| 2015/0302242 | A1 * | 10/2015 | Lee ....................... G06F 40/131 382/189 |
| 2015/0309966 | A1 | 10/2015 | Gupta et al. |
| 2016/0037071 | A1 | 2/2016 | Emmett et al. |
| 2016/0125613 | A1 * | 5/2016 | Shustorovich ....... G06V 10/242 382/140 |
| 2016/0253569 | A1 * | 9/2016 | Eid ........................ G06V 20/62 382/140 |
| 2017/0116494 | A1 | 4/2017 | Isaev |
| 2017/0185833 | A1 | 6/2017 | Wang et al. |
| 2018/0211243 | A1 | 7/2018 | Ekpenyong et al. |
| 2018/0330342 | A1 | 11/2018 | Prakash et al. |
| 2018/0376193 | A1 | 12/2018 | Sullivan et al. |
| 2019/0019020 | A1 | 1/2019 | Flament et al. |
| 2019/0197693 | A1 | 6/2019 | Zagaynov et al. |
| 2019/0213408 | A1 | 7/2019 | Cali et al. |
| 2020/0242348 | A1 | 7/2020 | Ast |
| 2020/0279138 | A1 | 9/2020 | Xu et al. |
| 2020/0410291 | A1 | 12/2020 | Kriegman et al. |
| 2021/0124919 | A1 | 4/2021 | Balakrishnan et al. |
| 2021/0182547 | A1 | 6/2021 | Ayyadevara et al. |
| 2021/0192136 | A1 | 6/2021 | Sar Shalom et al. |
| 2021/0312223 | A1 | 10/2021 | Klaiman et al. |
| 2021/0350516 | A1 | 11/2021 | Tang et al. |
| 2021/0360149 | A1 | 11/2021 | Mukul |
| 2021/0365677 | A1 | 11/2021 | Anzenberg |
| 2022/0132179 | A1 | 4/2022 | Bennett-James et al. |
| 2022/0139099 | A1 | 5/2022 | Ast |
| 2022/0224816 | A1 | 7/2022 | Pribble et al. |
| 2022/0351088 | A1 | 11/2022 | Kumar et al. |
| 2022/0358575 | A1 | 11/2022 | Smith |
| 2022/0414955 | A1 | 12/2022 | Ota |
| 2023/0030792 | A1 | 2/2023 | Zheng et al. |
| 2023/0101817 | A1 | 3/2023 | Sinha et al. |
| 2023/0143239 | A1 | 5/2023 | Yusuf et al. |
| 2023/0281629 | A1 | 9/2023 | Shevyrev et al. |
| 2023/0281820 | A1 | 9/2023 | Pizzocchero et al. |
| 2023/0298370 | A1 | 9/2023 | Nishioka |
| 2024/0061992 | A1 | 2/2024 | Bhatia et al. |
| 2024/0176951 | A1 | 5/2024 | Krishnamoorthy |
| 2024/0177487 | A1 | 5/2024 | Sohoni |
| 2024/0256955 | A1 | 8/2024 | Goodsitt et al. |
| 2024/0303658 | A1 | 9/2024 | Cohen et al. |
| 2024/0362417 | A1 | 10/2024 | Imani et al. |
| 2024/0428550 | A1 | 12/2024 | Gutierrez Valdes et al. |

OTHER PUBLICATIONS

Rybakova et al., "PESAC, the Generalized Framework for RANSAC-Based Methods on SIMD Computing Platforms", IEEE Access, pp. 82151-82166, 2023, vol. 1.

PCT International Search Report and Written Opinion for Application No. PCT/US2025/023145 mailing date Jun. 26, 2025, 34 pages.

Kada, Oumayma, et al. "Hologram detection for identity document authentication." International Conference on Pattern Recognition and Artificial Intelligence. Cham: Springer International Publishing, 2022. (Year: 2022).

Koliaskina, L. I., et al. "MIDV-Holo: A dataset for ID document hologram detection in a video stream." International Conference on Document Analysis and Recognition. Cham: Springer Nature Switzerland, 2023. (Year: 2023).

Piatrikova et al., "Digital Verification of Optically Variable Ink Feature on Identity Cards," 2023 33rd Conference of Open Innovations Association (FRUCT). IEEE, 2023. (Year: 2023).

Pouliquen, Glen, et al. "Weakly Supervised Training for Hologram Verification in Identity Documents." International Conference on Document Analysis and Recognition. Cham: Springer Nature Switzerland, 2024. (Year: 2024).

Soukup et al., "Mobile hologram verification with deep learning," IPSJ Transactions on Computer Vision and Applications 9 (2017): 1-6. (Year: 2017).

EPO Extended European Search Report for Application No. 25168952.7 mailing date Sep. 3, 2025, 7 pages.

EPO Extended European Search Report for Application No. 25168960.0 mailing date Sep. 3, 2025, 7 pages.

Document Verification System and Validation Against QR Codes; 2023 7th International Conference On Computing, Communication, Control And Automation (ICCUBEA) (2023, pp. 1-5); SS. Sambare, Utkarsh Pathak, Venu Sonavane, Mitali Gadiya, Suyash Musale; Aug. 18, 2023. (Year: 2023).

* cited by examiner

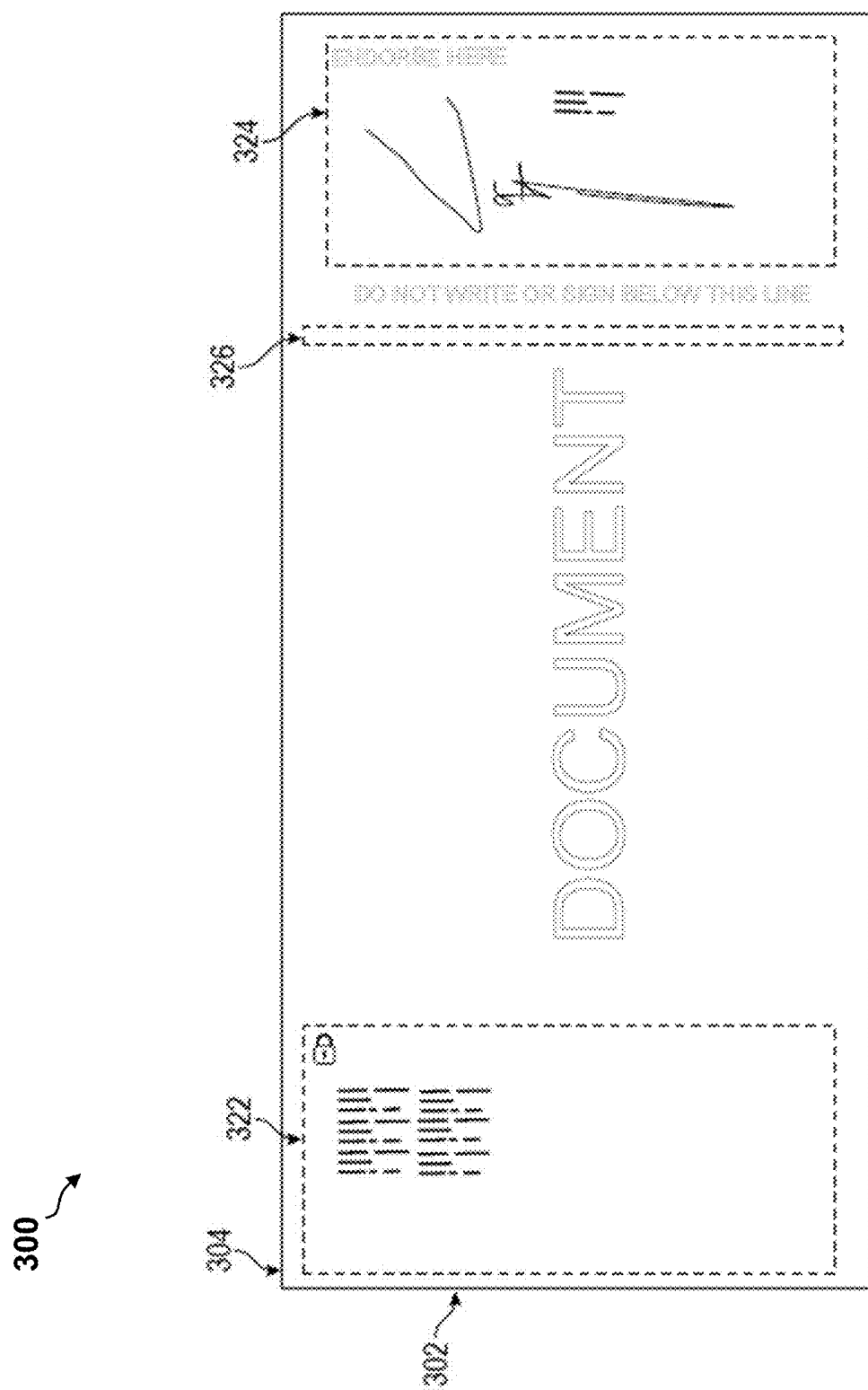

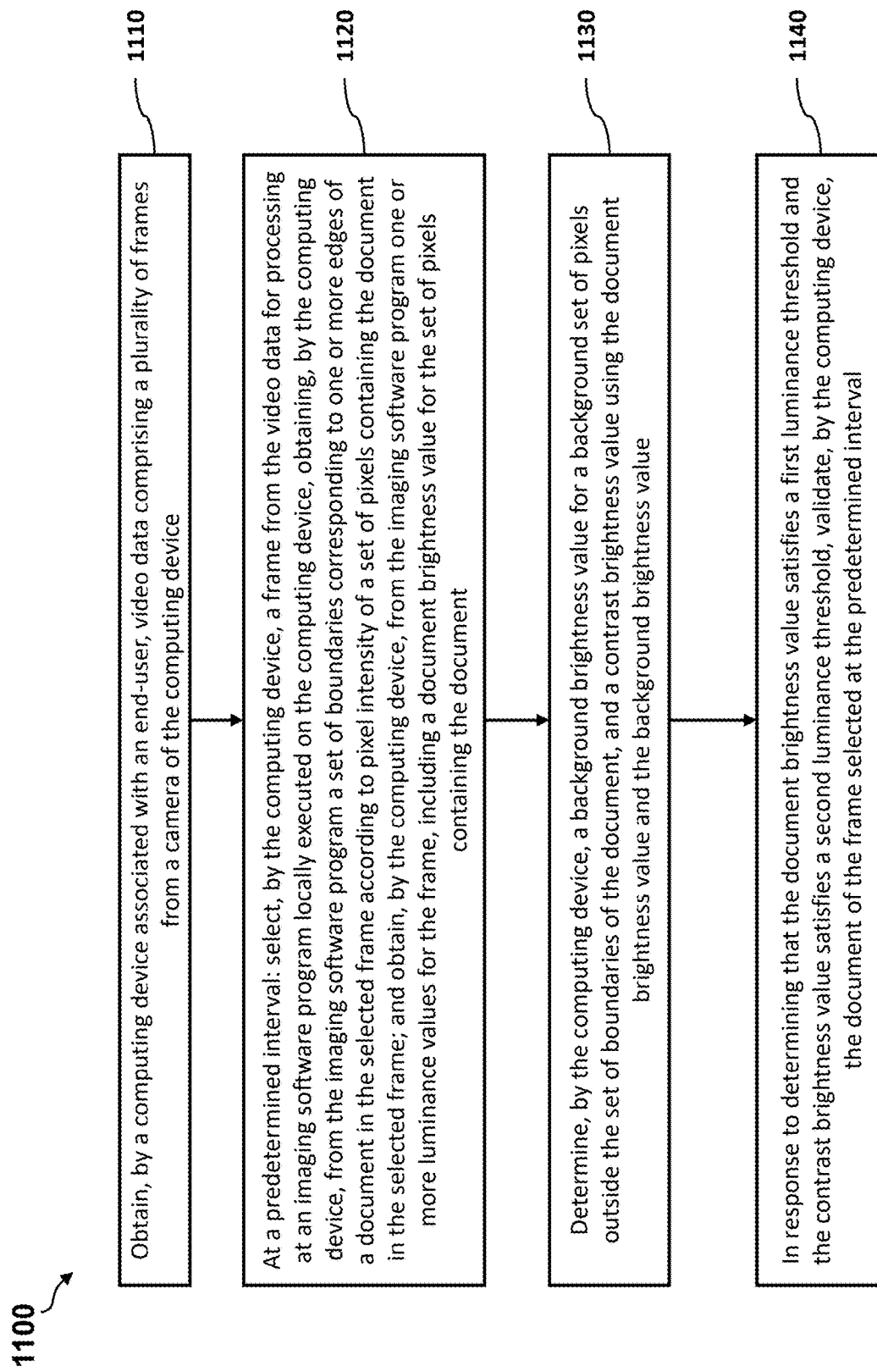

MACHINE-LEARNING MODELS FOR IMAGE PROCESSING

CROSS-REFERENCE TO RELATED APPLICATIONS

The application is a continuation-in-part of U.S. application Ser. No. 18/943,672, filed Nov. 11, 2024, which is a continuation-in-part of U.S. application Ser. No. 18/629,259, filed Apr. 8, 2024, each of which is incorporated by reference in its entirety.

TECHNICAL FIELD

The application generally relates to the field of detecting and processing content data from image data.

BACKGROUND

Depositing checks or other instruments can involve manual processes, such as traveling to a staffed location that has limited open hours. Checks can also be deposited by mail, though such delivery can incur latency of several days. In either case, however, trained personnel can inspect a check to verify authenticity and legibility. Further, non-optical features such as magnetic ink and tactile surfaces can aid in retrieving a data content of the check or establishing an authenticity thereof. Moreover, dedicated equipment can capture images of check according to a standard orientation, lighting, and so forth.

Some bank or non-bank institutions may offer a remote deposit capture option, wherein an image of a check is provided to the institution for processing. Although such an option may obviate a portion of the latency, travel, and staffing associated with other check deposits, it may be challenging to verify an identity of a user or an authenticity of the check. Further, detailed instructions provided to a user may not be rigorously adhered to and, in any case, may mitigate the convenience of the remote deposit capture option. Improvements in the art are desired.

SUMMARY

Institutions may receive electronic facsimiles of documents from remote users, from which information is extracted (e.g., financial instruments, such as checks). For example, the electronic facsimiles can be received as image data from a mobile device having a camera. The electronic provision of these documents may render inspection difficult. For example, a check may include any of various sizes, background images, and fonts (including combinations of handwritten portions and machine-printed portions). Further, such a system may be employed by various users under a combination of environmental conditions and/or hardware configurations (e.g., cameras, image processing hardware/firmware, etc.). Moreover, document security features, such as holograms, microprint, embossing, or security strips may be difficult to validate based on image data, in addition to the validation of the user themselves. Even where such document security features are validated (e.g., not mechanically manipulated), electronic manipulation of image data may remain a concern.

Many existing mobile operations software programs involve capturing image data remotely at users' mobile devices. Existing client-side technologies and server-side processing technologies have certain shortcomings that hinder the effectiveness in check image capture and validation. One issue is a reliance on third-party libraries, which introduces lag and performance issues due to the interaction between these third-party libraries and a mobile application that is attempting to capture images of a document. This results in slower processing times and occasional crashes, negatively impacting the user experience. Embodiments disclose herein implement a mobile application for client-side image processing and validation, which interacts with and leverages native image processing software (e.g., Apple VisionKit®) of the client device, where the image processing software and the mobile application include any number of machine-learning models for identifying a document (e.g., check) and attributes of the document for recognition and validation.

Embodiments may include a method for client-side processing and validation of document imagery, the method including: obtaining, by a computing device associated with an end-user, video data including a plurality of frames from a camera of the computing device; at a predetermined interval, selecting, by the computing device, a frame from the video data for processing at an imaging software program locally executed on the computing device; and obtaining, by the computing device, from the imaging software program a set of boundaries corresponding to one or more edges of a document in the selected frame according to pixel intensity of a set of pixels containing the document in the selected frame; identifying, by the computing device, one or more dimensions of the document based upon the set of boundaries of the document, the one or more dimensions including an aspect ratio of the document; and in response to determining that the one or more dimensions of the document satisfies a preconfigured aspect ratio threshold, validating, by the computing device, the one or more dimensions of the document as a document type.

Embodiments may include a system having a computing device associated with an end-user including at least one processor. The computing device may be configured to: obtain video data including a plurality of frames from a camera of the computing device for each of a plurality of instances of a predefined interval; at a predetermined interval, select a frame from the video data for processing at an imaging software program locally executed on the computing device; and obtain from the imaging software program a set of boundaries corresponding to one or more edges of a document in the selected frame according to pixel intensity of a set of pixels containing the document in the selected frame; identify one or more dimensions of the document based upon the set of boundaries of the document, the one or more dimensions including an aspect ratio of the document; and in response to determining that the one or more dimensions of the document satisfies a preconfigured aspect ratio threshold, validate the one or more dimensions of the document as a document type.

Embodiments may include a method for client-side processing and validation of document imagery, the method including: obtaining, by a computing device associated with an end-user, video data including a plurality of frames from a camera of the computing device; at a predetermined interval: selecting, by the computing device, a frame from the video data for processing at an imaging software program locally executed on the computing device; obtaining, by the computing device, from the imaging software program a set of boundaries corresponding to one or more edges of a document in the selected frame according to pixel intensity of a set of pixels containing the document in the selected frame; and obtaining, by the computing device, from the imaging software program one or more luminance values for the frame, including a document brightness value for the set of pixels containing the document; determining, by the computing device, a background brightness value for a background set of pixels outside the set of boundaries of the document, and a contrast brightness value using the document brightness value and the background brightness value; and in response to determining that the document brightness value satisfies a first luminance threshold and the contrast brightness value satisfies a second luminance threshold, validating, by the computing device, the document of the frame selected at the predetermined interval.

Embodiments may include a system including: a computing device associated with an end-user including at least one processor. The computing device may be configured to: obtain video data including a plurality of frames from a camera of the computing device; at a predetermined interval: select a frame from the video data for processing at an imaging software program locally executed on the computing device; obtain from the imaging software program a set of boundaries corresponding to one or more edges of a document in the selected frame according to pixel intensity of a set of pixels containing the document in the selected frame; and obtain from the imaging software program one or more luminance values for the frame, including a document brightness value for the set of pixels containing the document; determine a background brightness value for a background set of pixels outside the set of boundaries of the document, and a contrast brightness value using the document brightness value and the background brightness value; and in response to determining that the document brightness value satisfies a first luminance threshold and the contrast brightness value satisfies a second luminance threshold, validate the document of the frame selected at the predetermined interval.

BRIEF DESCRIPTION OF THE DRAWINGS

The accompanying drawings constitute a part of this specification, illustrate an embodiment, and together with the specification, explain the subject matter of the disclosure.

FIG. 3B depicts fields of a rear of a check derived from one or more devices of the system of FIG. 1, in accordance with some embodiments.

FIG. 11 is a flowchart of an example method for client-side processing and validation of document imagery.

DETAILED DESCRIPTION

Figure 1:
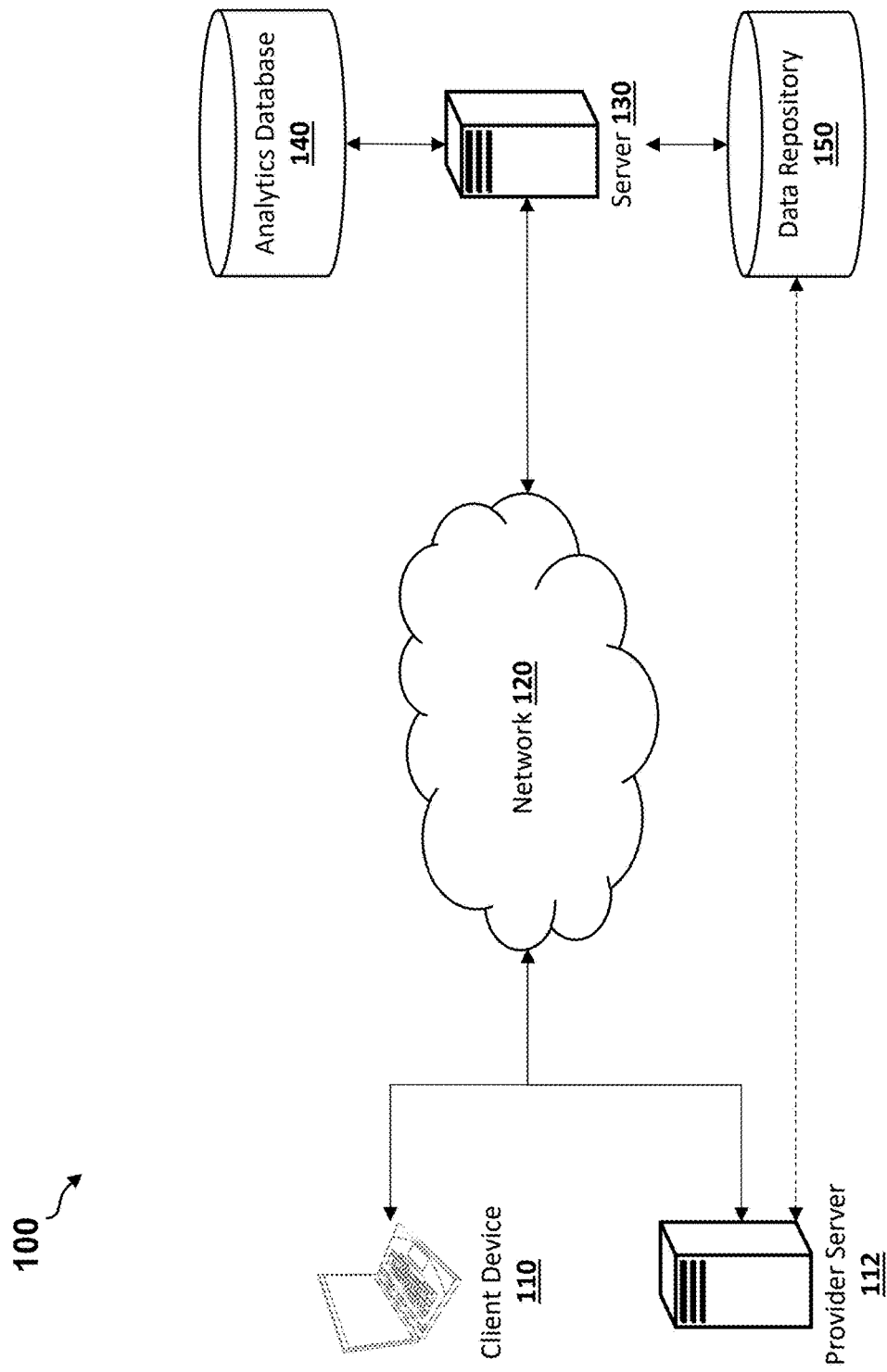
FIG. 1 is a block diagram showing computing components of a system for video and image processing, in accordance with some embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Many existing mobile operations software programs involve capturing image data remotely at users' mobile devices. Existing client-side technologies and server-side processing technologies have certain shortcomings that hinder the effectiveness in check image capture and validation. One issue is a reliance on third-party libraries, which introduces lag and performance issues due to the interaction between these third-party libraries and a mobile application that is attempting to capture images of a document. This results in slower processing times and occasional crashes, negatively impacting the user experience. Additionally, prior solutions often struggle with accurately capturing images that meet specific criteria such as brightness, contrast, and rectangular format. This often fails to validate checks properly, leading to errors and a poor user experience. Furthermore, existing solutions use non-AI methods, such as rule-based optical character recognition (OCR) for text or image recognition, which are less effective compared to machine learning algorithms. This limits its ability to perform additional validations, such as checking for account numbers and signatures on checks.

Embodiments disclose herein implement a mobile application for client-side image processing and validation, which interacts with and leverages native image processing software (e.g., Apple VisionKit®) of the client device, where the image processing software and the mobile application include any number of machine-learning models for identifying a document (e.g., check) and attributes of the document for recognition and validation. This mobile application uses the image processing software from a client operating system to control the camera and capture video having frames containing the document. The image processing software captures multiple frames and selects a frame at a preconfigured interval or instance within a batch of frames occurring at a preconfigured interval. The image processing software generates various types of information about the frame and the document, which the mobile application may request or otherwise access by invoking application programming interfaces (APIs) or software libraries of the image processing software. In this way, the mobile application can obtain information, such as brightness, contrast, rectangular format, and recognized text, among others, in the form of API outputs from the image processing software. As an example, the image processing software returns dimension related data about the document that the mobile application may use to perform rectangle detection to identify the check within the selected frame, using aspect ratio and tilt angle tolerance to validate accurate capture.

As a result, the mobile application benefits from the implementation of machine-learning models, such as neural network architectures, of the image processing software and the mobile application to improve results. Moreover, the improved processing by the machine-learning models is accomplished more efficiently, because the mobile application and mobile device need not implement or access third-party libraries or software in order to detect and validate the relevant information about the frame and the document.

FIG. 1 is a block diagram showing computing components of a system 100 for video and image processing, in accordance with some embodiments. The network environment of the system 100 can include any number of client devices 110 in network communication with a server 130. The server 130, like the client devices 110, can be in network communication with one or more databases 140, 150. For example, the server 130 can be in network communication with one or more analytics databases 140, data repositories 150, or provider servers 112.

The various devices of the system 100 can exchange information over a network 120. The network 120 can include a local network 120 and/or another network 120, such as a mobile telephone network 120. The (e.g., local) network 120 may employ various network topologies such as Wi-Fi networks based on any one of the Institute of Electrical and Electronics Engineers ("IEEE") 802.11 standards, wired networks based on any of the IEEE 802.3 networks, and so forth. For example, the network 120 can include Bluetooth, Direct Subscriber Line (DSL), Data Over Cable Service Interface Specification (DOCSIS), or satellite communications. Communicative connections over the network 120 can include a first link employing a first network topology or protocol and a second link employing a second network topology or protocol.

The network 120 may include any number of security devices or logical arrangements (e.g., firewalls, proxy servers, DMZs) to monitor or otherwise manage network traffic. Security devices may be configured to analyze, accept, or reject data exchanges with any of various client devices 110, provider servers 112, servers 130, or databases. In some embodiments, the security device may be a physical device (e.g., a firewall). Additionally or alternatively, the security device may be a software application (e.g., Web Application Firewall (WAF)) that is hosted on, or otherwise integrated into, another computing device of the system 100.

Aspects of the client device 110 are provided in accordance with some illustrative embodiments. Merely for brevity of the present specification, some components of the client device 110 are not further described with reference to the server 130. However, in some embodiments, any of the components or functionality of the client device 110 may be included in the server 130. Likewise, in some embodiments, the client device 110 can include any of the components or functionality of the server 130. Further, in some embodiments, a first portion of a component or functionality may be implemented on the client device 110 and a second portion of the component or functionality may be implemented on the server 130, such as the illustrative example of the image data selector 204 provided henceforth.

The client device 110 may be any electronic device comprising hardware and software components capable of performing the various tasks and processes described herein. Non-limiting examples of the client device 110 may include mobile phones, tablets, gaming consoles, laptops, smart watches, desktop computers, and personal computers, among others, which may be owned or used by a user. The client device 110 may include a processor, non-transitory memory, graphical user interface, and network interface. The client device 110 may include or receive media via a camera. The client device 110 may execute a mobile application (e.g., mobile application 801) associated with the server 130. An example of the graphical user interface may be presented at a display screen (e.g., touchscreen) of the client device 110. The network interface is provided for communicating over the network 120. The structure of the network interface 120 will depend on how the client device 110 interfaces with the network 120. For example, if the client device 110 is a mobile phone or tablet, the network interface may include a transmitter, receiver, or transceiver with an antenna for sending and receiving wireless transmissions to or from the other devices of the system 100.

Either of the client device 110 or the server 130 can include any number of constituent computing devices, sensors, or the like. For example, either of the client device 110 or the server 130 can be implemented via multiple physical or virtualized computing devices, each executing a service or microservice to implement an aspect of the present disclosure. Although a single instance of a client device 110 is depicted, embodiment of the present disclosure can interface with any number of such devices 110. For example, one or more instances of the server 130 can interface with thousands or millions of client devices 110, in some embodiments.

In some embodiments, the client device 110 can include a mobile device. The client device 110 may include any electronic computing device comprising hardware and software components capable of performing the various processes and tasks described herein. Non-limiting examples of the client device 110 include laptops, desktops, and mobile computing devices (e.g., smart phones, tablets), among others. In some embodiments, the server 130 may be implemented in a virtualized environment or a dedicated physical server. In some embodiments, the client device 110 and the server 130 can be implemented on a same computing device. References to a processor can include one or more physical devices such as general-purpose arithmetic logic units or, analog circuity, function-specific digital circuity, or other processing apparatuses. In some embodiments, a processor of the system may be distributed across a client device 110 and the server 130. For example, the processor can include a first processor of the client device 110, and a second processor of the server 130. The first and second processors can, in turn, include multiple processors themselves. For example, they may be implemented as multiple processors distributed across various server racks, virtual containers, or cores of a discrete device.

The client device 110 includes or is coupled to one or more sensors for capturing and generating videos and/or pictures. The sensors can include a camera to capture image data (e.g., video data, photo data) of various types of documents, such as checks. The camera can include or interface with local photo processing or adjustment tools. For example, the camera can include an autofocus, exposure adjustment, post-processor (e.g., image sharpener), or the like. The client device 110 transmits (e.g., batch file transmission; data streaming) video as captured (or as post-processed) to the server 130.

The client device 110 or the server 130 may execute a compression engine that includes software programming for compressing the image data or certain types of data extracted from the image data, such as feature vectors extracted from frames of video data. The camera of the client device 110 can include or interface with a compression engine. In some cases, the compression engine of the client device 110 or the server 130 executes image data compression functions for reducing the size of the image data (e.g., reducing an amount of binary data of the video data). For example, the compression engine performs video compression functions that compress individual frames of a video file or a video stream according to a video compression algorithm (e.g., H.264 or MPEG). In some cases, a compression engine of the client device 110 or the server 130 executes data compression functions for reducing an amount or dimensionality of features or feature vectors extracted, by a machine-learning architecture, from the image data. Additionally or alternatively, in some cases, the client device 110 or the server 130 executes a compression engine for reducing an amount of image data and/or video data by selecting and processing the image data of a subset of frames of a video stream. In this way, the client device 110 need not receive and process an entire video. The client device 110 processes the subset of selected frames or sequence of frames.

The image processing functions of the client device 110 may select certain frames of the video for performing various processing functions on the image data corresponding to the selected frames. The client device 110 may select the frames based on a user selection, a determination that the image data of the frame from the video feed exceeds a quality threshold or other metric (as determined by a machine learning architecture executing an engine related to data content or image characteristic thereof) or based on image characteristics of immediately preceding or subsequent frames.

Figure 2:
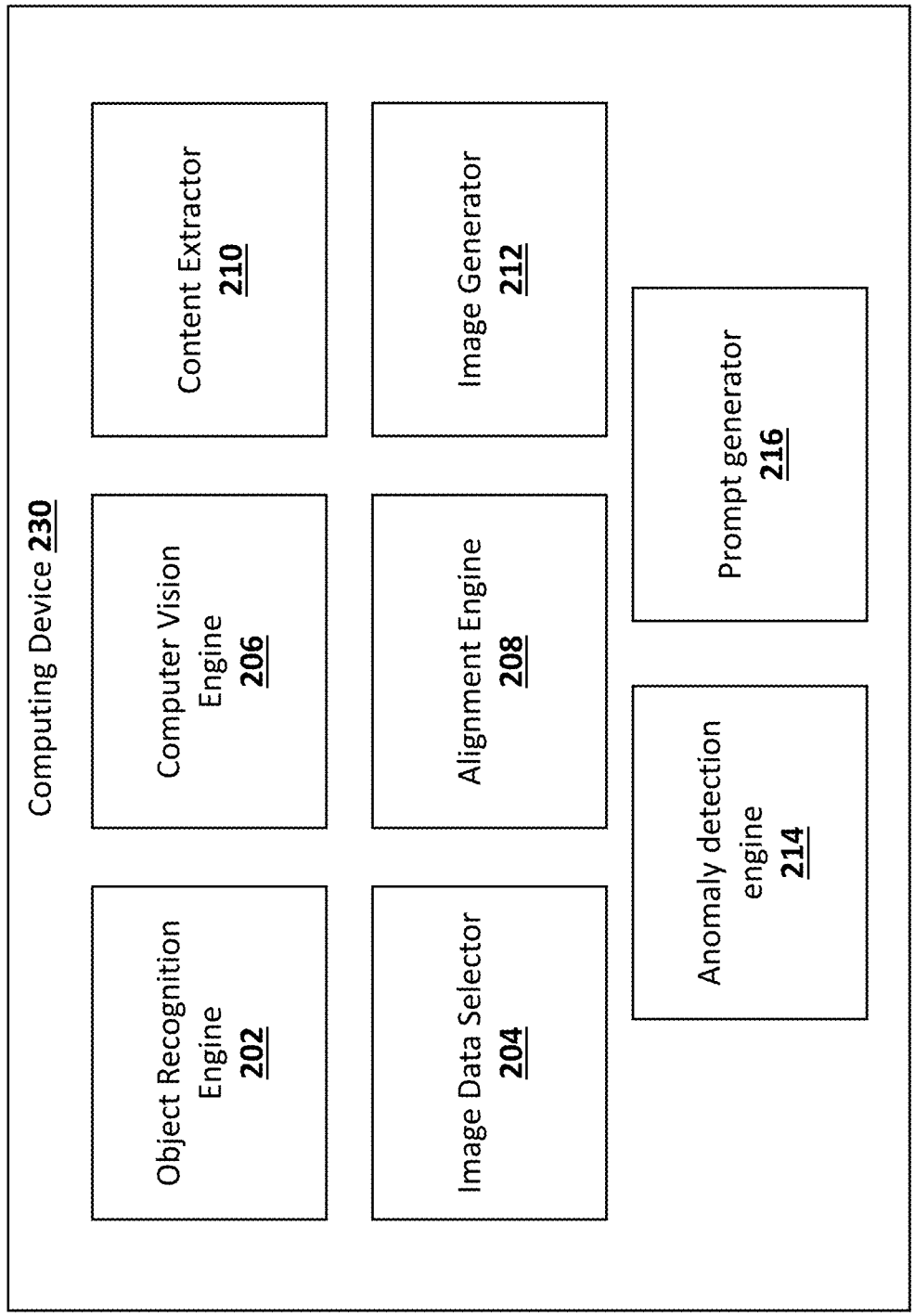
FIG. 2 depicts a block diagram of a computing device (e.g., client device, server), in accordance with some embodiments.

As mentioned, in some embodiments, the execution of the compression engine can compress selected features of the image data of a single frame or multiple frames (e.g., via the content extractor 210 of FIG. 2). For instance, the selected features can include visual image characteristics (e.g., portions of an image exterior to a bounding box or a dynamic alignment indicator) that may be represented by preconfigured types of representational features. As an example, the machine-learning architecture of the client device 110 (or server 130) may extract a set of features from the image data of the frames to form a feature vector corresponding to the document in the video. The machine-learning architecture executed by the client device 110 includes layers or functions that can apply a transform function to all or a subset of the frames. In some embodiments, the client device 110 may execute the transform functions on the frames of the image data prior to transmitting the image data and/or feature-related data to the server 130. The client device 110 can extract and reduce the features, feature vector, transform, or histogram associated with the image data in the video feed. Such transforms can include visual transforms, such as de-skewing or reorienting, or other transforms, such as transformations of the hyperplane or various further phase spaces.

The client device 110 can generate a video feed including image information or image data for transmission to the server 130. In some embodiments, the video feed can include a live feed provided contemporaneously to its capture. In some embodiments, the video feed can include a conveyance of stored image data (e.g., a video file). For example, the stored image data can be provided according to a video format such as .MP4, .AVI, or .MPG. In some embodiments, the image data, a portion thereof, or information accompanying the image data can include features extracted from the image data, such as image feature vectors, compressed data, annotations, etc. In some embodiments, the video feed can include image data selected randomly from captured data, or responsive to a detection of an object within the image data (e.g., a detection of an existence of an object or a comparison of the object to an image quality threshold).

The client device 110 can generate an overlay for presentation via a display integral thereto, or otherwise coupled therewith. For example, the client device 110 can generate any of the displays depicted in FIGS. 4A-4E. The client device 110 can include a mobile wallet. For example, the mobile wallet can include account or payment information, such as access to one or more accounts. The mobile wallet can interface with accounts, to aid in the remote deposit of checks. The client device 110 can include one or more identifiers, (e.g., unique identifiers). The device identifiers may include identifiers of the mobile device, including telephone numbers, International Mobile Equipment Identities (IMEI), MAC addresses, Universally Unique Identifiers (UUID), advertising identifiers, etc. The device identifiers may include identifiers of the mobile wallet, such as a wallet ID, account number, token, biometric data, etc. Any such information may be available to the server 130, via a network connection with the client device 110 itself, or as received from a data repository 150 accessible to the server 130. Some data stored by the data repository 150 may be duplicative to information stored on the client device 110. Some data stored by the data repository 150 may otherwise correspond to information stored on the client device 110 (e.g., a corresponding key of an asymmetric key pair, a hash of biometric data, etc.). Accordingly, in some embodiments, the server 130 may verify an identity based on a comparison between information received from a client device 110 and corresponding information retrieved from the data repository 150.

The sensors of the client device can include a location sensor configured to generate location coordinates or other location data. For example, a Global Navigation Satellite System (GNSS), such as Global Positioning System (GPS), may be employed to generate location coordinates. Such location data can be provided to the sever 130 as fine or course location data. In some embodiments, the location sensor can include other sensor types. For example, the location sensor can include a Wi-Fi transceiver or cellular modem to detect a presence or Received Signal Strength Indicator (RSSI) of proximal wireless networks. Such wireless networks may or may not be associated, by the server 130, with a particular geographic location. For example, the location data can include an indication of a proximity of a wireless network or other indicia of location without explicit indication of a particular geographic location.

The provider servers 112 can include third party or other remote data sources. For example, the provider servers 112 can include an automated clearing house (ACH) or an addressable location for further entities. The entities can include financial institutions corresponding to data content of the document, such as according to a linkage between a routing number, address, or other source indicia of a check, and a linkage to the financial institutions stored in the data repository corresponding to such source indicia. Any networked components can exchange data with the provider servers 112. For example, the server 130 can cause a check image (e.g., a composite check image) to be conveyed to initiate an ACH transaction for a deposit or settlement thereof. Likewise, networked components can receive data from the ACH or other provider servers 112. For example, in some embodiments, any of the information of the data repository 150 can be received from the provider servers 112. In some embodiments, a provider server 112 can exchange data with the networked devices via off-line data transfer (such as to batch transfer image training data, location data, metadata, etc.).

The analytics database 140 can include any of the models discussed herein. References to a machine learning model employed by a component of the server 130 can refer to various models according to any of the description provided herein. For example, in some embodiments, the server 130 can employ a same trained model for various components. The server 130 can retrieve the various models for execution according to a machine learning architecture thereof.

In some embodiments, the various models of the analytics database 140 may include separate models for each of the various components discussed herein. For example, a first feature extraction model can extract features to identify a document in video frames, a second feature extraction model can determine features to determine an image quality, a third feature extraction model can determine features to generate a bounding box for the check, and a fourth feature extraction model can extract content data (e.g., account numbers and deposit amounts) from various fields of the document. Such models can include, for example, one or more same components (e.g., a thresholder to define an edge between a document and a background) trained with different data (e.g., first training data to discriminate between a presence or absence of a check, second training data to discriminate between a legible and illegible document, and so forth). In this way, training data may be specific to a particular task (e.g., non-check documents can be used as positive class data to determine document legibility, but negative class data to determine if a check is present).

The analytics database 140 can include feature vectors (sometimes referred to as embeddings, without limiting effect) corresponding to image data of one or more frames. For example, the embeddings can encode image characteristics such as color, texture, or shapes. A feature vector may include indicia of a check type or source (e.g., logos, images, addresses, routing numbers, patterns, or so forth). The source can include a financial institution, check printer, check book, physical location, etc. For example, a feature vector stored in the analytics database 140 can include indicia of a watermark pattern which is associated with a user or a drawee of a check. If a drawee is known according to previous checks having blue checkered backgrounds, then a check having a green striped background may be indicative of an anomaly, such as a low quality image or fraudulent activity.

In some embodiments, aspects of the feature vector may correspond to images or other data stored by the data repository 150. For example, such information can include field information (e.g., deposit amounts, sequential check numbers, or so forth) or other account such as location data or account history. The server can employ the information of the analytics database 140 in combination with the data repository 150 to detect anomalous behavior. For example, if a check is regularly provided in an amount of $123.45, then a check of $5,123.45 received according to such a schedule may be anomalous.

A feature vector may include indicia of anomalies, such as blurring or smudging, texture irregularities, an absence or degradation of a watermark or other image, irregular characters spacing, and so forth. Such indicia can indicate that a document has been manipulated, counterfeit, or damaged (e.g., to activate a chemically sensitive ink). In some embodiments, the feature vector can embed temporal information, such as frame-to-frame features, of the feature vector. Inconsistent or abrupt motions or jitter can indicate a presence of an anomaly detected according to the operations of the machine learning environment disclosed herein. The detection of the anomaly can further be based on location data. For example, a location associated with high incidence of fraud or a perfectly stationary location (e.g., lacking jitter) can be indicative of an anomaly.

The analytics database 140 can store a reference feature vector. A reference feature vector can refer to a reference such as a "known good" document, or various further document classifications (e.g., a digital manipulated image, low confidence OCR image, high quality image, moderate quality image, or the like). A reference feature vector can be derived from one or more images. For example, an image quality reference feature vector can be a composite of hundreds or thousands of high quality images, with other dimensionality excised (e.g., to include checks from various banks, drawees, printers, or other document such as textbook scans, identification card scans, etc.). Other reference feature vectors can include fewer source images. For example, a reference feature vector for a small credit union or particular drawee can be derived from one or several image feature vectors. In some embodiments, a feature vector can include non-image information such as an account balance, credit or other risk-based score, location data, etc.

The analytics database 140 can include thresholds to correspond to any of the feature vectors, or features thereof (e.g., one or more dimensions of a hyperplane). For example, a quality threshold can relate to a quality of an image, or a similarity threshold can relate to a level of matching or similarity between a received image a reference feature vector (e.g., of a drawee or other source). For brevity, "thresholds" may be referred to as binary thresholds such that a particular input can exceed or not exceed. However, according to various embodiments, any of the thresholds disclosed herein can be gradated, such as to include high, medium, and low levels. Such gradations can be employed by the machine learning architecture disclosed herein, such as according to the prompt generator 216 of FIG. 2. For example, a deposit with a low fraud score may be deposited and made immediately available; a deposit with a moderate fraud score may be deposited and a hold issued pending further action; a deposit with a high fraud score may be rejected.

Any of the models of the analytics database 140 can be trained from training data of the data repository 150. The data repository 150 can include image data received from various client devices 110, account data such as user profile information (e.g., photographs, billing or mailing addresses, user behavior (e.g., geodata), metadata associated with the image data (e.g., location data), etc.). For example, the data repository 150 can include information associated with a particular client device 110 (e.g., previously deposited checks) or from further client devices 110 (e.g., checks deposited from other users). The image data can include check images from a same source. Such sources can include, for example, a same endorser, drawee bank or other institution, or a check printer, to include an authorized printer or unauthorized printer (e.g., counterfeiter). In some embodiments, the server 130 may cause any of the data of the data repository 150 to be vectorized for ingestion by the analytics database 140.

The information stored in the data repository 150, which may be used to train the models of the analytics database 140, can include unlabeled, auto labeled, or manually labeled data. For example, in some embodiments the content data is associated with a predefined label, category, or classification. In some embodiments the content data is processed to determine patterns, clusters, or structures without reference to predefined labels.

The data repository 150 can exchange information with any of various internal or external sources. For example, the data repository 150 can receive image data or associated metadata from the provider server 112 (e.g., an ACH, third party financial institution, etc.). The data repository 150 can include a linkage with one or more data elements of the analytics database 140. For example, the analytics database 140 can include image vectors, or other representations of information in the data repository 150 associated with image data (e.g., frames or video files) of the data repository 150.

An identifier (e.g., unique identifier, account number, timestamp, etc.) can link image data or other information of the data repository 150 with a feature vector or other representation of the analytics database 140. In some embodiments, the data repository 150 can provide image data along with any associated transaction data, such as a transaction identifier, deposit amount, deposit account, etc. For example, the image data provided to the provider server 112 can include a representative image of a document, such as an image generated from one or more frames of the video feed. Likewise, as indicated above, such information can be incorporated in feature vectors including image data.

FIG. 2 depicts a block diagram of a computing device 230 (e.g., client device 110, server 130), in accordance with some embodiments. For example, the depicted computing device 230 can be employed as a client device 110 in the system 100 of FIG. 1. The computing device 230 can execute software executable functions or features of a machine learning architecture. The various functions or features may be referred to as engines or other components of the machine learning architecture, without limiting effect. The computing device 230 executes components of image control software (e.g., VisionKit®), including object recognition engine 202, image data selector 204, computer vision engine 206, and content extractor 210. The computing device 230 may further execute components of mobile application that provides instructions and requests information from the image control software about images in frames selected from video data.

The machine learning architecture of the computing device 230 includes layers and functions that are defined by or executed as software routines of the object recognition engine 202. The object recognition engine can detect, within image data, an object. For example, the execution of the object recognition engine 202 can identify a document such as a check within a video feed. The object recognition engine 202 can include an image preprocessor. The execution of the image pre-processor can perform noise reduction, image resizing, contrast adjustment, edge detection (to determine the presence of the check or field demarcation), etc. In some embodiments, in addition to (or instead of) the object recognition engine 202, other aspects of a system 100 can be executed, by the machine learning architecture, to preprocess images. For example, a camera or mobile wallet application of the computing device 230 may be configured to adjust contrast, image size, denoising, etc. In some embodiments, the object recognition engine 202 can share one or more components with other aspects of the system disclosed herein. For example, edge detection may be performed via one or more components of the computer vision engine 206 (e.g., a bounding box generator). Such an illustrative example is not intended to be limiting. In some embodiments, the execution of the object recognition engine 202 can implement a separate preprocessor or share additional components with other aspects of the system 100. For example, in some embodiments, the execution of the object recognition engine 202 can implement a same component of a feature extractor as the execution of the content extractor 210.

An execution of the object recognition engine 202 can invoke a feature extractor to detect features of the check which may be used to tag the frame data of the video feed as including or excluding a document such as a check. An indication that a document is included may include an indication that the document is physically present, or that features can be extracted from the image. For example, the feature extractor can determine geometric characteristics, such as a shape, size, orientation, resolution, sharpness, focus, pixel-wise image intensity, or so forth. Such features may be provided to the analytics database 140 for comparison to further images according to the execution of the object recognition engine 202 by the machine learning architecture.

A classifier of the object recognition engine 202 can classify image data according to one or more of the extracted features. For example, the classifier can include a support vector machine (SVM), decision trees/random forest, neural network, Bayesian (e.g., Naïve Bayes), an ensemble model of one or more of such models, etc. In some embodiments, the classifier is a binary classifier to discriminate between a presence of a check and an absence of a check. In some embodiments, the classifier is a non-binary classifier to discriminate between various document classifications (e.g., a hand-written check, pre-printed check, front or rear facing of a check, potentially fraudulent check, check which is similar to previously deposited checks, blurred or other compromised image of a check, image data which has been digitally manipulated, document which has been mechanically manipulated, etc.).

In some embodiments, the execution of the object recognition engine 202 implements the classifier separately for each frame of the video feed. For example, the execution of the object recognition engine 202 can cause the classifier to determine a subset of frames including a check (or other image classifications) and tag such frames. When used with at least some frame formats, subsets or combinations of frames may be employed for such frame-by-frame tagging. For example, the classifier can tag only intra-coded (I) frames, or combinations of I-frames with predictive (P)-frames or Bidirectional-Predictive (B)-frames. In some embodiments, the execution of the object recognition engine 202 can cause the classifier to determine a tag for one or more frames based on further combinations of frames (e.g., preceding or subsequent frames), such as according to a memory state model. For example, the object recognition engine 202 can include a recursive neural network (RNN) such as a Long Short-Term Memory (LSTM) model.

Any of the models of the object recognition engine 202 can be retrieved, by the computing device 230, from the analytics database 140 for execution. Moreover, any image data or other content data received by the machine learning architecture can be stored at the data repository 150 and may, in turn, be used to train the models. Any detection, determination, or so forth realized by the machine learning architecture can be appended to an image feature vector, image metadata, or otherwise stored at the data repository 150. For example, the data can be stored as a label annotation.

The machine learning architecture of the computing device 230 includes layers and functions that are defined by or executed as software routines of the image data selector 204. The image data selector 204 can select image data of a frame. For example, the image data selector 204 can select frames according to a quality of the image data thereof. The images can refer to at least one frame including an object, such as a check. The frames can include any of an I-frame or a combination of an I-frame with a B-frame or P-frame.

In some embodiments, the machine learning architecture can execute the image data selector 204 to select frames from all frames of a document, or a subset of frames. For example, the execution of the image data selector 204 can cause a receipt of a subset of frames based on the identification of a document (e.g., a check) from the object recognition engine 202. Moreover, the execution of the image data selector 204 can cause the machine learning architecture to select image data from a subset of the individual frames. For example, the machine learning architecture can execute the image data selector 204 to select image data corresponding to a check and not to a background, or of one or more subfields of the check (e.g., MICR symbols which are present on multiple checks, an endorsee signature, or so forth). In some embodiments, the image data selector 204 determines a quality (e.g., similarity) score for a document on a frame-to-frame basis. In some embodiments, the image data selector 204 determines the quality score on a field-to-field basis, or for a sequence of frames. In some embodiments, the image data selector 204 employs spatial-temporal patching to determine a quality of a portion (e.g., one or more fields) of a document over a period of time (e.g., a frame sequence). According to such an embodiment, the image data selector 204 can determine an image quality for more than one portion of the check. Thus, various fields of the check having a highest quality score (or a quality score in excess of a threshold), may originate from different frames.

In some embodiments, a reference feature vector of the analytics database 140 may be associated with a reference image of the data repository 150. For example, a reference image can include a labeled image. The labeled image may be labeled manually, or according to a semi-supervised process. For example, a first image can be manipulated to generate any number of derivative reference images. The derivative reference images can include, for example, added noise, skewing, reduced resolution, or reduced dimensionality according to various phase spaces. Thus, the reference images (and feature vectors corresponding thereto) may vary in quality according to a known amount.

The similarity comparison of the feature vector is not intended to be limiting. In some embodiments, other dimensions of quality may be employed. For example, in some embodiments, the image data selector 204 can perform text or other annotations for one or more fields of an object detected in the frame. A generative AI model, such as a large-language model (LLM) or a multimodal LLM, can ingest the text annotations and compare the annotated text to corresponding annotations of various images which are labeled as to a quality (e.g., as exceeding a quality threshold or not exceeding a quality threshold). In some embodiments, the image data may be manipulated (e.g., noised, skewed, reduced dimensions, etc.) to compare to the LLM, such that the LLM comparison can determine a dimensionality or compression level of the unmanipulated image (e.g., by adding a known quantity of noise, image annotation may be degraded a quantifiable amount, indicative of an original quality of source image data).

In some embodiments, the image data selector 204 can select image data from a sample of frames. For example, the image data selector 204 can determine a quality of a random sample of frames, or periodic frames (e.g., every $10^{th}$ frame), or predetermined frame of a batch of frames (e.g., middle frame of a set of 30 frames captured for one-second of video). Upon a determination that an object in a frame exceeds a quality threshold (or is the highest quality of the sample of frames), the image data selector 204 can determine a quality for adjoining frames.

In some embodiments, the execution of the image data selector 204 can cause the machine learning architecture to select a frame or a sequence of frames for a front facing of a document, and a frame or a sequence of frames for a rear facing of a document. In some embodiments, the execution of the image data selector 204 can cause the machine learning architecture to terminate upon a selection of the frame or sequence of frames exceeding the quality threshold. In some embodiments, the execution of the image data selector 204 can cause the machine learning architecture to process all frames or all sampled frames to determine a highest quality frame. Such a determination can be made via a comparison to a reference feature vector (e.g., a quality feature vector). In some embodiments, multiple feature vectors corresponding to various frames of the video feed are compared to each other. For example, the compared feature vectors can include feature vectors having reduced dimensionality to as to be predictive of quality (e.g., retraining planes which exhibit correlation to quality in excess of a threshold and omitting planes which do not exhibit correlation to quality in excess of the threshold).

The quality can refer to a legibility of text or other image characteristics (e.g., a sharpness or recognition of security features). In some embodiments, the quality is determined according to a similarity to a reference feature vector. The reference feature vector can be defined from a single reference image, or according to a combination of multiple reference images. For example, the reference feature vector can include features from one or more images indicative of legibility (e.g., corresponding to sharpness, contrast, dynamic range, or noise). The machine learning architecture can execute the image data selector 204 to select a frame based on a similarity with a reference. For example, the execution of the image data selector 204 can generate a feature vector for the image data for comparison to the reference feature vector. The generated feature vector can be generated via a feature extractor of the image data selector 204.

A similarity may refer to a distance between the reference feature vector and the generated feature vector. For example, the distance can refer to a cosine distance, Euclidean distance, Chebyshev distance, or so forth. In some embodiments, a similarity threshold refers to a distance threshold (e.g., a cluster boundary between a cluster including the reference feature vector and another cluster boundary). Such a distance can be between separate frames or other spatial or spatial-temporal patches of the video feed, or relative to a selected reference feature vector.

In some embodiments, a selection of a reference feature vector can depend on a classification of the object recognition engine. For example, a separate reference may be retrieved, by the computing device 230, according to a bank of a drawee, a handwritten or pre-printed check, a hardware configuration of the computing device 230, or other aspects of the document or image data received by the computing device 230.

In some embodiments, various dimensions of the feature vector for image data can be cast into textual strings. The machine learning architecture can include a large language model (LLM) configured to ingest such strings to determine image characteristics including image quality. Either of the LLM or the image feature vector can be pruned of dimensions which are not predictive of quality. Thusly, the generation of the feature vector and the subsequent ingestion of the LLM can form a two stage feature pipeline to provide an indication of quality.

The computing device 230 can execute a computer vision engine 206 to identify or otherwise define and annotate or label the image data to indicate a boundary between the object (e.g., document) detected by the object recognition engine 202 and other portions of the image data. The machine-learning architecture includes layers and functions that are defined by or executed as software routines of the computer vision engine 206. The computer vision engine 206 can generate a label or annotation for pixels or portions of the image data, such as a bounding box, to bound a check from a background of one or more frames of video data. The machine-learning model of the computer vision engine 206 is trained to identify and annotate various types of documents. In some embodiments, the computer vision engine 206 can label or annotate the document based on information received from the object recognition engine 202 (e.g., object data such as a centroid, edge, or other image characteristic). The computer vision engine 206 may receive an indication of features corresponding to pixel information of the image data and outputs annotation information associated with the image data, such as pixel information indicating vertices of the bounding box situated within updated annotated image data. As an example, the computer vision engine 206 may define a rectangular bounding box having vertices corresponding to the pixel information (e.g., a bounding box) at or within in a proximity threshold to the detected document object edge. In this example, the pixel information includes a minimum X pixel location, minimum Y pixel location, maximum X pixel location, and maximum Y pixel location, among other types of pixel information for presenting the image data containing the annotated object (e.g., a bounding box situated around a check).

The execution of the computer vision engine 206 need not receive and implement pixel-level information from the object recognition engine 202. In some implementations, the computer vision engine 206 can receive a binary indication of presence, or other classification of a type of object of an image, from the object recognition engine 202. The computer vision engine 206 may process frames based on the receipt of such information. For example, the computer vision engine 206 includes a machine-learning model or other layers and functions of the machine-learning architecture trained to determine image features for the frames of the image data having a classified object (e.g., type of document), responsive to the indication of the detected presence. The computer vision engine 206 can generate elements for an augmented reality (AR) display of an augmented image. For example, the computer vision engine 206 can generate bounding box information for an augmented image.

As mentioned, the computer vision engine 206 includes a machine-learning model or other layers or functions of the machine-learning architecture trained to identify an object to annotate a boundary (e.g., define pixels for a bounding box) between a document and a background or other image data of the video feed. For example, the computer vision engine 206 can employ feature detection (e.g., via the feature extractor of the object recognition engine 202, or another feature extractor). The computer vision engine 206 can cause the machine learning architecture to detect features including edges, corners, or textures of a boundary between the document and other image data (e.g., a countertop, table, floor, etc.). In some embodiments, the features can include features of the document itself, such as an orientation or position of text, decorative or other features (e.g., vertical or horizontal lines such as a payee line, endorsement line, or borders).

In some embodiment, the execution of the computer vision engine 206 can cause the machine learning architecture to apply an edge detection algorithm to detect an edge of a paper document, a thresholding algorithm to segment the document (or portions thereof) from the background, a contour detection algorithm, or so forth. Where the edges of the document are identified, a boundary box can bound the document from the background.

In some embodiments (e.g., as depicted hereinafter at FIG. 4C) the execution of the computer vision engine 206 may cause the machine learning architecture to determine a bounding box relative to an orientation of image data of the video feed (e.g., a rectangular boundary box having edges aligned with rows and columns of the image data). In some embodiments, the execution of the computer vision engine 206 can align or de-skew, or otherwise adjust an orientation of an object to match document edges, such that a bounding box can be provided with respect to a document within the image data (e.g., to generate bounding boxes having edges aligned with the edges of the documents). That is, bounding boxes can be applied as conformal boxes, such as via an application of a spatial transform of an image, or via bounding box decomposition/approximation.

The machine learning architecture of the computing device 230 includes layers and functions that are defined by or executed as software routines of the alignment engine 208. The alignment engine 208 can determine an alignment of an image. The execution of the alignment engine 208 can further provide a dynamic alignment guide responsive to the determined alignment. In some embodiments, the machine learning architecture executing the alignment engine 208 receives alignment information from another component of the computing device 230 (e.g., the computer vision engine 206). The alignment engine 208 can generate the dynamic alignment guide for inclusion in a same or different layer of an augmented image as the image generated for AR display by the computer vision engine 206.

In some embodiments, the execution of the alignment engine 208 can determine an alignment according to features extracted from image data including a document, such as a check. For example, the execution of the alignment engine 208 can identify a corner, edge, or other portion of a document according to any of the techniques referred to with respect to the object recognition engine 202 or the content extractor 210.

The machine learning architecture may execute the alignment engine 208 in coordination with the activation of the camera and present an ongoing video feed from the camera having virtualized overlays within the video feed. For instance, the graphical user interface may present a video feed of the client device 110 with an overlay of a bounding box or other alignment guide as generated or retrieved by the computing device 230. Optionally, the computing device 230 may receive still image data or stored video data and generate the overlays on the still image or video data. The user may operate the client device 110 by interacting with the graphical user interface. The computing device 230 may then generate an alignment guide. The computing device 230 can then cause to be presented, the graphical user interface including the image data and the alignment guide.

Figure 3A:
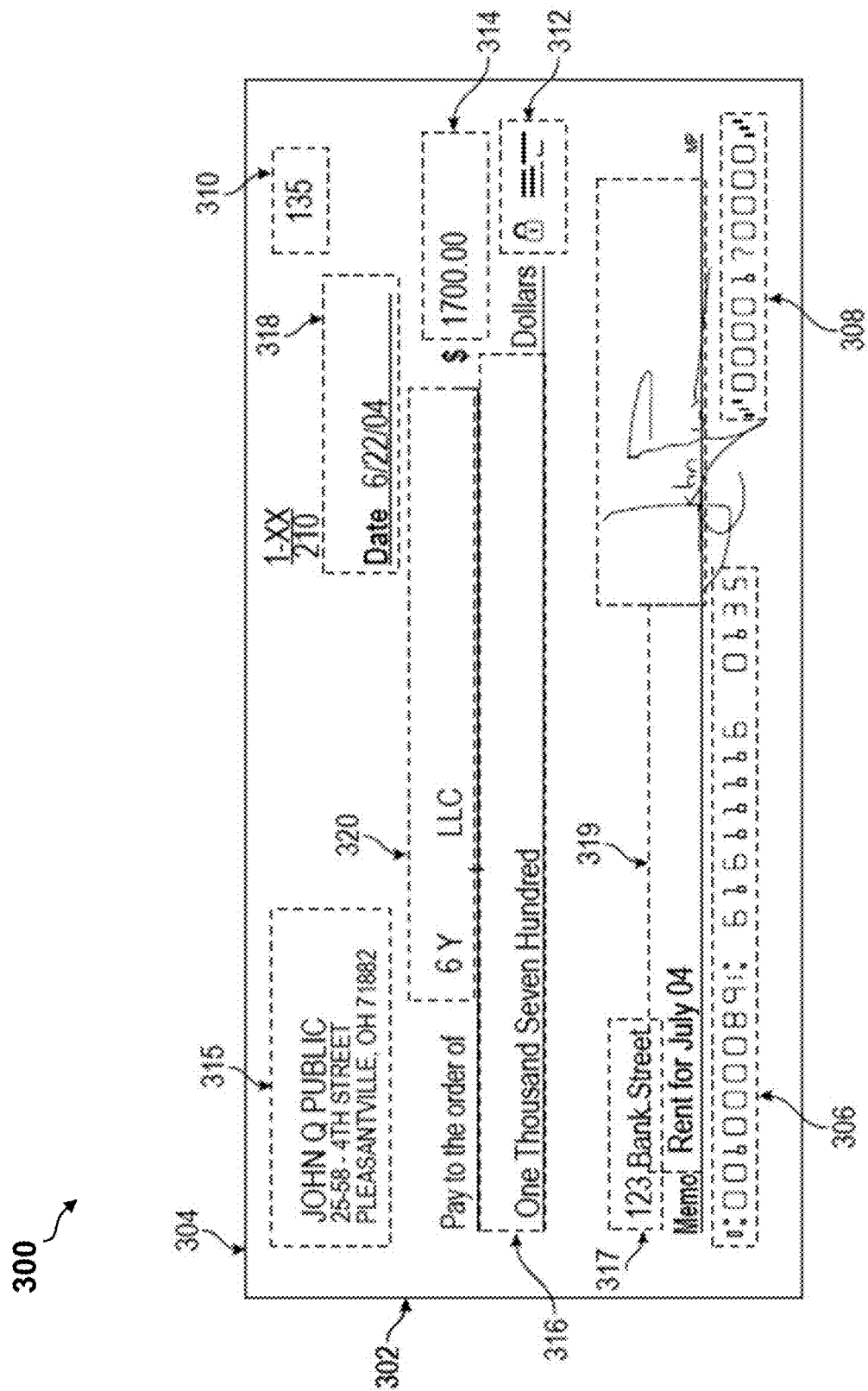
FIG. 3A depicts fields of a front of a check derived from one or more devices of the system of FIG. 1, in accordance with some embodiments.

In some embodiments, the machine learning architecture executes the alignment engine 208 to determine a position of one or more fields of a document. For example, the execution of the alignment engine 208 can determine a position of data content such as an account or routing number field (e.g., a Magnetic Ink Character Recognition (MICR) symbol thereof) to determine whether an edge of a check is a top, bottom, left, or right side, or whether a depicted image includes an image of a front face of a check (e.g., as depicted in FIG. 3A) or a rear face of the check (e.g., as depicted in FIG. 3B). In some embodiments, the execution of the alignment engine 208 can omit an alignment guide absent a determination of check alignment. For example, the execution of the alignment engine 208 can omit provision of a portion of an overlay prior to detection of the alignment (or provide an indication of a lack of such detection, such as a prompt to capture the check or an indication that no check is detected). Although referred to as MICR fields or characters, no inference of a magnetic or other sensor particular thereto is intended. For example, the MICR field can be recognized according to optical detection alone in at least some embodiments.

The machine learning architecture can execute the alignment engine 208 to generate one or more dynamically generated alignment guides for presentation to a user. For example, the execution of the alignment engine 208 can, upon identification of an edge, corner, field, or other aspect of a check, generate an alignment guide corresponding thereto. In some embodiments, the execution of the alignment engine 208 can generate a portion of an overlay (e.g., a vertical line) corresponding to a vertical edge along the top or bottom of a check. In some embodiments, the alignment engine 208 can generate a portion of an overlay (e.g., a corner locator) corresponding to the corners of the check. In some embodiments, the alignment engine 208 can generate a field indicator indicative of one or more fields of the check. For example, the field indicator can indicate a field of the check, such as an account number field, routing number field, combination thereof, endorsement field, etc. A presentation of one or more of the dynamically generated alignment guides can be provided to a client device 110 to aid a user capturing a check. For example, the presentation may provide an indication, to a user, that the document is not detected, or provided a location of a detected object. Some illustrative examples of alignment guides are provided hereinafter, with respect to FIGS. 4A-4E.

The machine learning architecture of the computing device 230 includes layers and functions that are defined by or executed as software routines of the content extractor 210. The content extractor 210 can extract content data from image data or other received data (e.g., metadata associated with image data). For example, the content extractor 210 can extract content from bounded or unbounded image data, or from metadata (e.g., from a check, a background, or location data).

Content data can include any of the various planes of feature vectors disclosed herein. Content data can include annotated text from various fields of a document such as a check. For example, a text annotation can include a transcription of the text (e.g., via OCR), an indication of a color, font, handwritten portion or printed-ness, position relative to other fields/features, etc. Content data can further include frame-to-frame displacement of various content data. For example, incident to movement of a check, image sharpening, variations of edge detection, or so forth, a relative position may be detected to differ on a frame-to-frame basis. In some embodiments, such displacement can exceed a displacement threshold so as to indicate an anomaly.

Content data can include various features or characteristics of a check, such as a watermark, or features of typography. For example, content data associated with a manual signature (sometimes referred to as a "wet" signature) can vary from content data of a printed signature. Content data can further include location data, client device identifiers (e.g., mobile wallet identifiers), or other metadata received with or corresponding to image data.

In some embodiments, the content extractor 210 (like other feature extractors of the present disclosure) can include a decoder of a neural network of the machine learning architecture. The execution of the decoder can decode information encoded into an image according to a printing, endorsement, manipulation, or filming thereof. The execution of the decoder can cause it to operate on either of the image data itself (along with any corresponding metadata) or on a feature vector corresponding thereto. That is, in some embodiments, either of a feature extractor or an image flatten can define an input layer for the decoder. For example, the decoder can decode various image characteristics from the image as processed by a feature extractor. Such image characteristics can include labeled features of training data (e.g., an indication of digital or mechanical manipulation of a document, such as a presence of chemically sensitive ink or artifacts of digital manipulation). Such image characteristics can include unlabeled correspondence, including patterns determined from training data which are not expressed in a spatial-temporal dimension. The decoder can be a stand-alone decoder, or an encoder of an encoder-decoder pair (e.g., an autoencoder). For example, the content extractor 210 or other models herein can ingest training data (e.g., determine weights between various layers of a model) according to patterns or relationships inferred of the autoencoder.

The computing device 230 can include an image generator 212 to generate a representative image of a document of the video feed. The image generator can generate a single image from one or more frames of the image data. For example, the image generator 212 can generate an image for conveyance to a provider server. Such an image is sometimes referred to as an Image Replacement Document (IRD) or "Check 21 Image," without limiting effect.

In some embodiments, the representative image is selected according to a quality score. For example, an image having a highest quality score of the image data selector 204 can be selected as the representative image, or a precursor therefor. In some embodiments, the representative image (or a precursor therefor) is selected according to a spatial or spatial-temporal patch. For example, a patch for one or more first fields of a document can be selected from a first frame, and a patch for one or more second fields of a document can be selected from a second frame. Thus, if a check is out of focus, or somewhat out of frame, at least a portion of the information may be included in an output image generated by the content extractor.

The machine learning architecture of the computing device 230 includes layers and functions that are defined by or executed as software routines of the image generator 212. The image generator 212 can manipulate image data to generate a representative image (also referred to as an output image, without limiting effect) in conformance with a resolution, contrast, legibility, or other aspect. In some embodiments, the representative image can include appended information, or additional metadata may be provided along therewith. The representative image may further be edited to reduce dimensionality (e.g., may be manipulated to remove color information), or reduce a file size of the image. For example, the execution of the image generator 212 can perform a denoising of the image data.

The execution of the image generator 212 can determine a fidelity metric of the generated image with regard to one or more source images. For example, the fidelity metric can depict a difference between an input as captured (e.g., according to one or more frames), and the representative image. For example, substantial denoising, text replacement or other operations to improve a quality metric of the document can reduce a fidelity to the original frame data. Such improvement may aid some aspects of a remote deposit capture scheme, but may complicate other aspects, such as document traceability, subsequent recognition, or conformance with an accord to provide an image representative of a source image (e.g., with respect to further bank or non-bank financial institutions, such as an ACH). For example, the fidelity metric can be compared to a fidelity threshold corresponding to human perceptible changes, a recognition of one or more systems, or according to an inter-party agreement as to fidelity of representative images such as the Check 21 image provision schema. In some embodiments, the fidelity threshold applies to a subset of potential image manipulations. For example, a rotational correction to an orientation or rescaling may not reduce a fidelity threshold in some embodiments.

The execution of the image generator 212 can generate an image according to the quality threshold and the fidelity threshold. A magnitude by which the quality or fidelity metric exceeds the quality or fidelity threshold, respectively, may be referred to as a margin. A positive margin thus indicates a metric which exceeds the threshold, while a negative margin indicates a metric which does not meet the threshold. In some embodiments, the image generator 212 can determine a local minimum to equalize (e.g., locally maximize) the quality and fidelity margin. For example, an image can be sharpened, de-noised, or otherwise manipulated to improve a quality margin to the detriment of a fidelity margin (or vice versa).

In some embodiments, the execution of the image generator 212 can otherwise generate an image meeting or exceeding each of the quality threshold and fidelity threshold. For example, the execution of the image generator 212 can determine a local maximum for the fidelity holding the quality to the threshold or determine a local maximum for the quality holding the fidelity to the threshold. In some embodiments, the machine learning environment can, via execution of the image generator 212, determine that an image cannot be generated which meets both of a quality and fidelity threshold, and may prompt a user to generate additional image data (e.g., via the prompt generator 216).

The machine learning architecture of the computing device 230 can includes layers and functions that are defined by or executed as software routines of the anomaly detector 214 to detect anomalous content associated with image data. The anomaly detector 214 can generate a risk score based on evidence of physical manipulation of a document digital tampering (e.g., a liveness score), or other associated data (e.g., metadata). For example, the anomaly detector 214 can detect manipulation of a document via detection of wet signatures or printed signatures or outlier deposit amounts. The anomaly detector 214 can determine a liveness score via image data indicative of digital tampering such as deepfake detection according to spatio-temporal distortions, lighting or shadow irregularities, or other detection methods of a machine learning architecture. The anomaly detector 214 can detect risk relevant metadata via comparison of a check to another check of a same drawee bank associated with high incidents of fraud, a GPS location, a check number which matches a check number which has already been deposited, or other information retrieved from an analytics database 140.

The execution of the anomaly detector 214 can detect anomalies based on content of the image data or associated data (e.g., metadata) such as location data. Although the execution of the anomaly detector 214 can detect any of the anomalies, risk indicia (e.g., risk scores), or so forth described herein, such examples are not intended to be limiting. Indeed, the anomaly detector 214 can detect various patterns in any of the data of the data repository 150, even where those indicia are not explicitly provided (e.g., labeled) as corresponding to an anomaly or risk. For example, at least one model of the anomaly detector 214 can include a model trained on labeled data of the data repository 150. For example, the training data can include checks exhibiting anomalies such as illegible or mis-transcribed characters, outlier amounts, typographic errors, mis-sequenced check numbers, or manipulation. The execution of the anomaly detector 214 including the trained models can detect further anomalies according to the training. Such anomaly detection can include binary indications of anomalous/non-anomalous, an anomaly risk score, or a classification according to any of the classifiers provided herein.

The anomaly detector 214 can generate a liveness or risk score based on any of the information received or identified in the document. In some implementations, the anomaly detector 214 may determine the liveness or risk score based upon determining or computing a level of variation or similarity between attributes of the document amongst various frames of the video data. For instance, the anomaly detector 214 may generate the liveness or risk score based upon the information derived from the frames of the image data and compare the information of these frames to determine the frame-to-frame variation or similarities of the document, which may include identifying and comparing attributes of the document (e.g., visual characteristics of a check), metadata associated with the document or the image data (e.g., location data of the user device streaming the video data), and/or content data representing various types of content recognized by the server in the document (e.g., name of a bank for a check document; name of the bank customer listed on the check). As an example, the server may recognize and compare numeric or textual values (e.g., a text string indicating a name of a bank) in the image data of consecutive frames of the video data.

In some cases, the anomaly detector 214 may determine the liveness or risk score based upon identifying and comparing attributes of the document (e.g., visual characteristics of a check), metadata associated with the document or the image data (e.g., location data of the user device streaming the video data), and/or content data representing various types of content recognized by the server in the document (e.g., name of a bank for a check document; name of the bank customer listed on the check) against data records for similar documents having known or likely incidents of fraud.

As indicated above with regard to the object recognition engine 202, such anomalies can be detected according to the data of a single frame. For example, the machine learning architecture can execute the anomaly detector 214 to detect an anomaly within a frame of an image. Such anomalies can include, for example, irregular character spacing, visual artifacts evident of digital or mechanical manipulation (e.g., voids in a watermark), a printed signature for a bank or drawee typically associated with a wet signature, or so forth. Indeed, the detection of the anomaly may be with regard to any dimension of a hyperplane.

In some embodiments, as indicated above with regard to the object recognition engine 202, such anomalies can be detected according to the multi-frame data which can include spatial-temporal patching or full video data. For example, the anomalies can be detected according to frame-to-frame variances in content data or physical locations/dimensions, judder, irregular movements, or so forth, in addition to any of the techniques described with regard to a single frame. Indeed, multi-frame data may be employed to increase confidence of a single frame analysis.

In some embodiments, the anomalies can be detected with further regard to other than image data, such as metadata associated with a video feed. For example, execution of the anomaly detector 214 can cause an ingestion of location data which may, for example, match an area associated with high rates or fraud, appear to be spoofed, not match an expected location for a user, or otherwise indicate an anomalous transaction. In another example, execution of the anomaly detector 214 can cause an ingestion of deposit account data which may, for example, deviate from typical amounts or relationships between a drawee and drawer of a check.

The machine learning environment of the computing device 230 can include layers and functions that are defined by or executed as software routines of the prompt generator 216 to provide cues to a user, via the user interface. For example, the execution of the prompt generator 216 can generate a prompt to a user to provide a response via the user interface, or take another action, such as adjust video capture of a document or execute further communication. The various prompts of the prompt generator 216 can be conveyed from the server to the client device 110 for presentation via the user interface. The prompt generator 216 can generate the prompts for inclusion in a same or different layer of an augmented image as the image generated for AR display by the computer vision engine 206 or the alignment engine 208.

The machine learning environment can execute the prompt generator 216 to prompt a user to adjust an orientation of a camera associated with the client device, or a position of a document. For example, a corresponding prompt can include an indication that a document is not detected, not legible, that a camera is obscured, that the camera should be closer to or further from the document, and so forth. Some prompts associated with the prompt generator can be related to or coextensive with alignment guides of the alignment engine 208, bounding boxes of the computer vision engine 206, or other aspects of the present disclosure. For example, subsequent to an elapsed time wherein the bounding box is not generated (or is generated according to a confidence interval less than a corresponding threshold, or for which a dynamic alignment indicator is not provided), the prompt generator 216 can provide a prompt including instructions to capture the check in the video feed.

In some embodiments, the instructions are based on the video feed, such as an indication that the image data is too dark, out of focus, unable to attach to a camera driver, or so forth.

The machine learning environment can execute the prompt generator 216 to prompt a user to provide additional input information via the video feed. For example, the machine learning environment can determine, via execution of the anomaly detection engine 214, that a potential anomaly exists with regard to one or more fields (e.g., a mis-transcribed digit, or an anomaly related to a deposit amount, security feature, or the like). The prompt generator 216 can generate a prompt to request additional video data of such an element (e.g., a zoomed-in or expanded view of one or more blurred fields of a check). In some embodiments, the execution the prompt generator 216 can generate prompts for other information such as a request to include a drivers license or other identification into a same or separate video feed, a request to change an orientation of a document (e.g., to flip over a check), a request to include biometric information such as to provide a face or thumb in a video feed (or via another sensor of the mobile device, such as a thumb-print reader associated with the mobile wallet).

The machine learning environment can execute the prompt generator 216 to prompt a user to provide authentication data via the client device 110. For example, a prompt can prompt a user to enter a pin or other identity number, passphrase/challenge phrase, or other verification. In some embodiments, such verification can include out of band communication such as 2FA, or by initiating a telephone call with a representative. The machine learning environment can execute the prompt generator 216 to prompt another device in network communication with the computing device 230 to perform an action. For example, the actions can include a deposit, placing a hold or fraud alert on an account, or so forth.

FIG. 3A depicts fields of a front of a check 300 derived from one or more devices of the system 100 of FIG. 1, in accordance with some embodiments. The depicted check 300 is not intended to be limiting; corresponding fields of various documents may be identified according to the present disclosure. The check 300 may be defined according to a boundary including an edge 302 between the check and a background of an image. Edges 302 can intersect at corners 304, which may be identified according to the intersection of the corners, or features corresponding thereto (e.g., according to a corner response function, gradient calculation, or the like). Either of the edges 302 or the corners 304 can be detected according to the execution of the object recognition engine 202 or the computer vision engine 206. Fields can correspond to any of the content of the fields provided herein (e.g., as extracted by the machine learning architecture executing the content extractor 210).

A MICR line 306 can include various data fields such as an account number, a routing number, a check number, or other check information. In some embodiments, the MICR line 306 can include multiple fields, such as wherein an execution of a content extractor 210 can determine a separate field (e.g., a check number field, routing number field, or check number field). For example, the execution of the content extractor 210 can include an employment of OCR or aspects of an object recognition engine 202 to detect MICR delimiting characters. Further, fields can include an auxiliary field 308 for MICR information such as an "on-us" internal field (e.g., a field indicating a specific type of account or an instruction for how the check should be processed). A check number field 310 can provide an indication of a sequence of a check. For example, a check number field 310 can correspond to a sequence of a check in a physical booklet or an electronic sequence, wherein other instances of check number associated with the drawee are stored in the data repository.

A security indica field 312 can provide an indication of a security device of the check. For example, the security device can include a watermark, microprinting, security threads, color shifting ink, chemical sensitivity, fibers or planchettes, hologram, void pantograph, and so on. Some security features can be detected according to an execution of a content extractor 210, whereupon further content data of the check 300 can depend upon the detected security features. For example, frame-to-frame variation corresponding to a hologram may be indicative of a lack of an anomaly, wherein frame-to-frame variation corresponding to a lack of a hologram may be indicative of an anomaly.

A numerical amount field 314 includes a deposit amount. A written amount field 316 also includes the deposit amount. The systems and methods herein can verify a correlation between the numerical amount field 314 and the written amount field 316 (or further data, such as an entered deposit amount). The systems and methods herein can further compare other such fields, such as between the check number of the check number field 310 and the check number of the MICR line 306, or a security feature and a check source. Further fields can include a drawee address field 315, memo field 317, date field 318, institution address field 319, or drawer identity field 320.

Some fields can include pre-printed or handwritten text. Particularly, the MICR line 306, auxiliary field 308, check number field 310, and at least some aspects of the security indica field 312 are depicted as preprinted, whereas other fields, such as amount fields (e.g., the numerical amount field 314 and written amount field 316) can include handwritten content. The machine learning architecture can execute the content extractor 210 to extract the textual content of the fields as well as further data content such as the indica of printed of handwritten text. Some fields can omit textual content (e.g., a signature).

FIG. 3B depicts fields of a rear of a check 300 derived from one or more devices of the system 100 of FIG. 1, in accordance with some embodiments. Particularly, fields of a rear of the check 300 can include security information 322 or other data such as institution contact information, which may by correlated to a check design or an inclusion of one or more security features. The rear facing further includes an endorsement area 324 demarcated by a demarcation line 326.

Figure 4A:
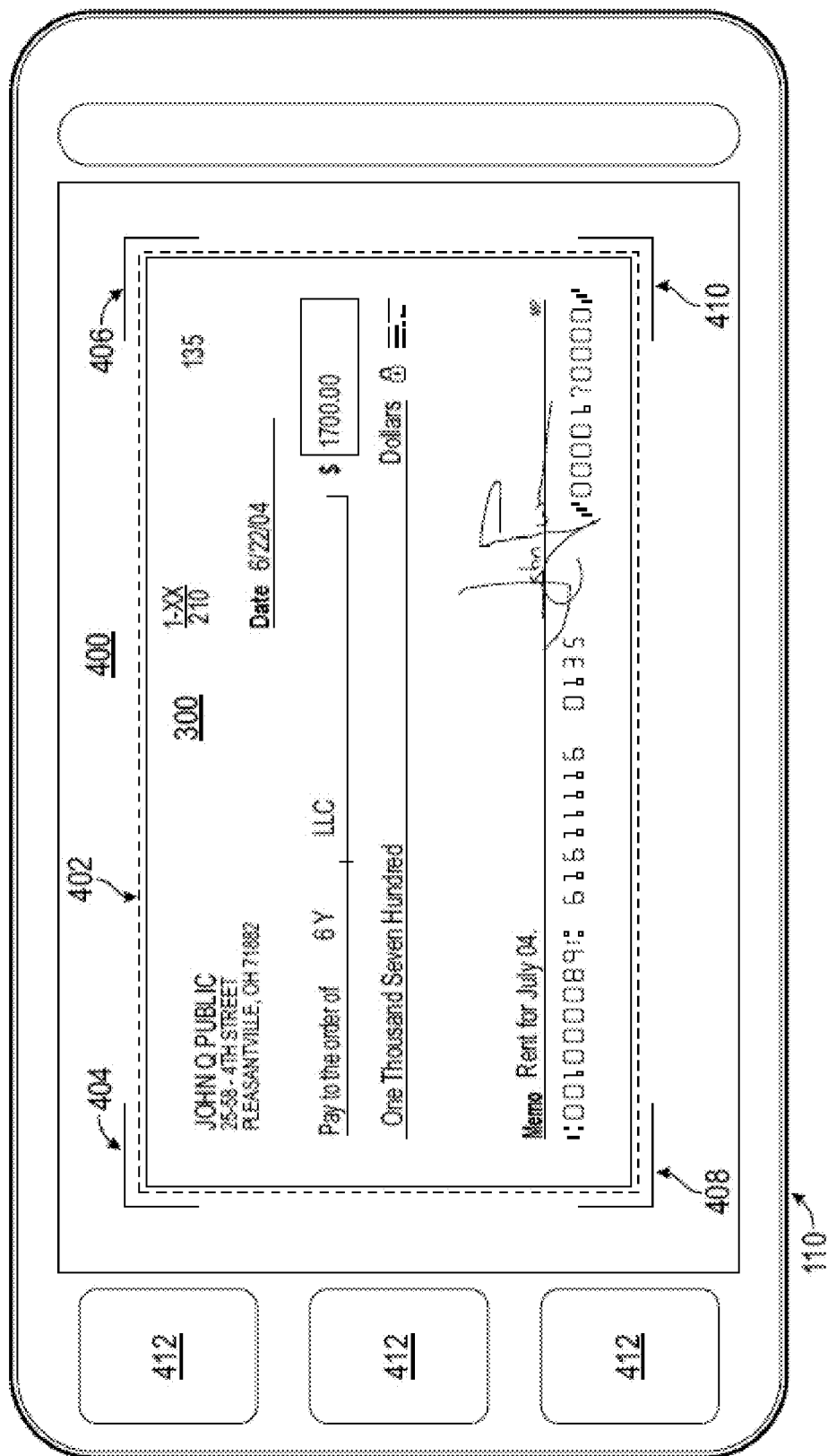
FIGS. 4A-4E depict graphical user interfaces containing a check and an overlay presented to a user at client device, in accordance with some embodiments.

FIG. 4A depicts an overlay of a client device 110 (or client device 810) presenting a graphical user interface 400 including a check, in accordance with some embodiments. As depicted, the graphical user interface 400 presents icons corresponding to the check 300. A bounding box 402 bounds the check from a background captured by the camera and depicted in the graphical user interface 400. The depicted bounding box 402 is a rectangular bounding box 402 defined according to vertices thereof. An outline of the bounding box 402 can vary according to a confidence corresponding thereto. Such an outline can include a dashed line as shown, or a solid line, double line, thicker line, etc. In some embodiments, the outline or other indication of the bounding box 402 can include a color, textual cue, or so forth. For example, the body of the check 300 can be highlighted in green, the background can be covered in a cross-hatched pattern, etc. In some circumstances, the depiction of the graphical user interface does not necessarily correspond to a video feed conveyed to a server (e.g., server 112, 130). For example, the graphical user interface 400 can include a subset of image data to aid a user to capture content data of the check 300, while additional information can be provided to the client device 110 or server (e.g., to include the background information). Moreover, the overlay or bounding box data may not be conveyed to the server. Indeed, in many embodiments, such elements are received from the server for presentation by the client device 110.

As depicted, a first dynamic alignment indicator 404 corresponds to a first vertex of the bounding box 402. A second dynamic alignment indicator 406 corresponds to a second vertex of the bounding box 402. A third dynamic alignment indicator 408 corresponds to a third vertex of the bounding box 402. A fourth dynamic alignment indicator 410 corresponds to a fourth vertex of the bounding box 402. The depicted dynamic alignment indicators are not intended to be limiting, various such indicators may be employed according to various embodiment of the present disclosure (e.g., closed indicators, overlayed over or concentric with the bounding box, an indicator for one or more fields or characters of the check 300, etc.).

One or more control elements 412 of the user interface are depicted as buttons. Further control elements 412 can include, for example, a mouse or keyboard or a touchscreen of the client device 110. The control elements 412 can provide responses to prompts or otherwise convey information from a user to the client device 110 or server.

Figure 4B:
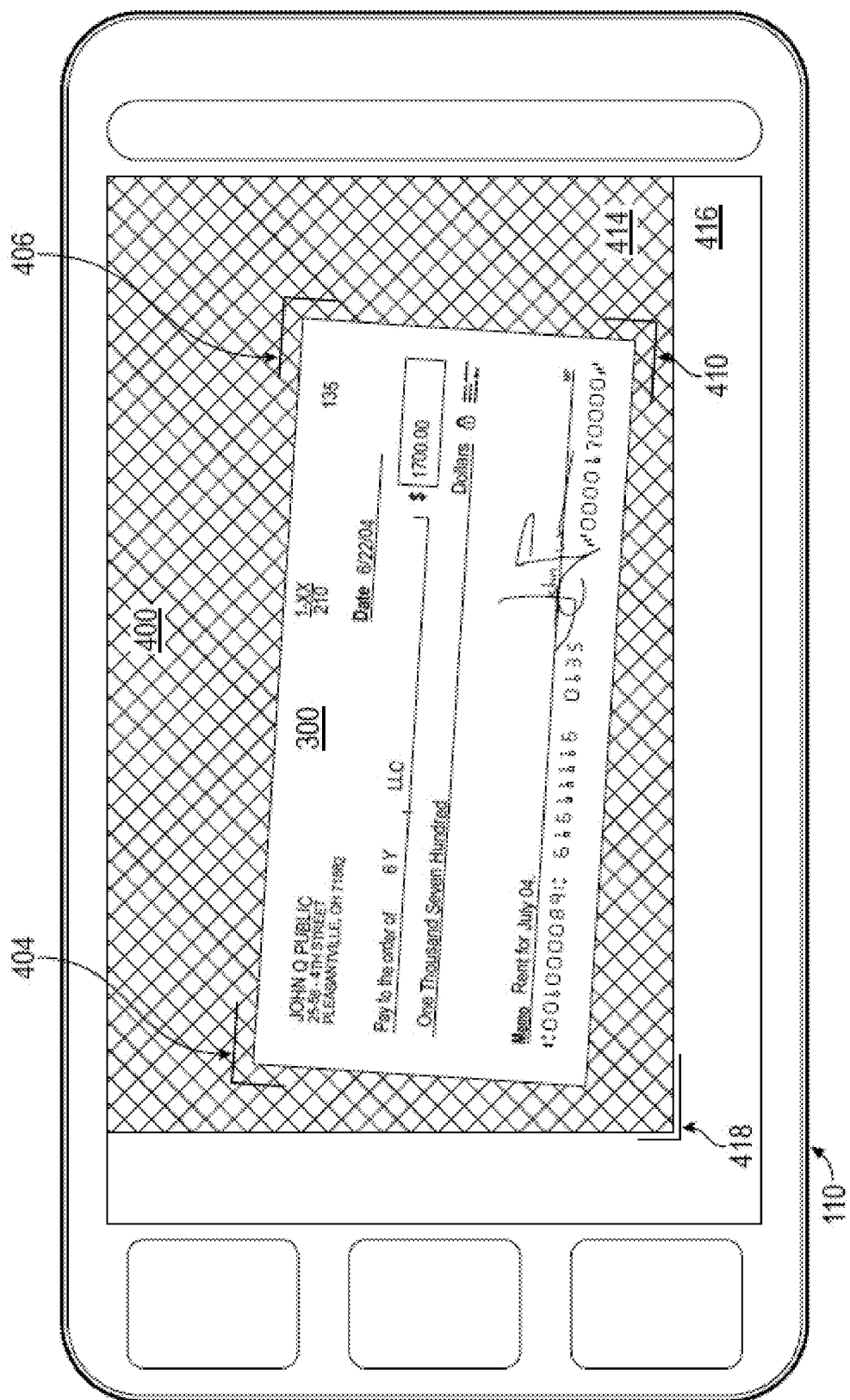

Referring now to FIG. 4B, another overlay of a client device 110 (or client device 810) presenting a graphical user interface 400 associated with a check 300 is provided in accordance with some embodiments. As depicted, the check 300 is provided along with a background including a first zone 414 (e.g., a countertop) and a second zone 416 (e.g., a floor). As shown in FIG. 4B, a bounding box 402 is omitted from the graphical user interface 400 of the depicted embodiment.

As depicted, each of the first dynamic alignment indicator 404, second dynamic alignment indicator 406, and fourth dynamic alignment indicator 410 are shown along with the check 300 according to a skew angle of the check 300 relative to the user device 110. However, a fifth dynamic alignment indicator 418 is shown as conforming to a corner of the first zone 414 rather than to the corner of the check 300 or bounding box 402. Such a display may prompt a user to adjust a focus, check location, or otherwise revise the orientation of the video feed. However, in some embodiments, the systems and methods herein can tolerate substantial skew or misalignment.

Figure 4C:
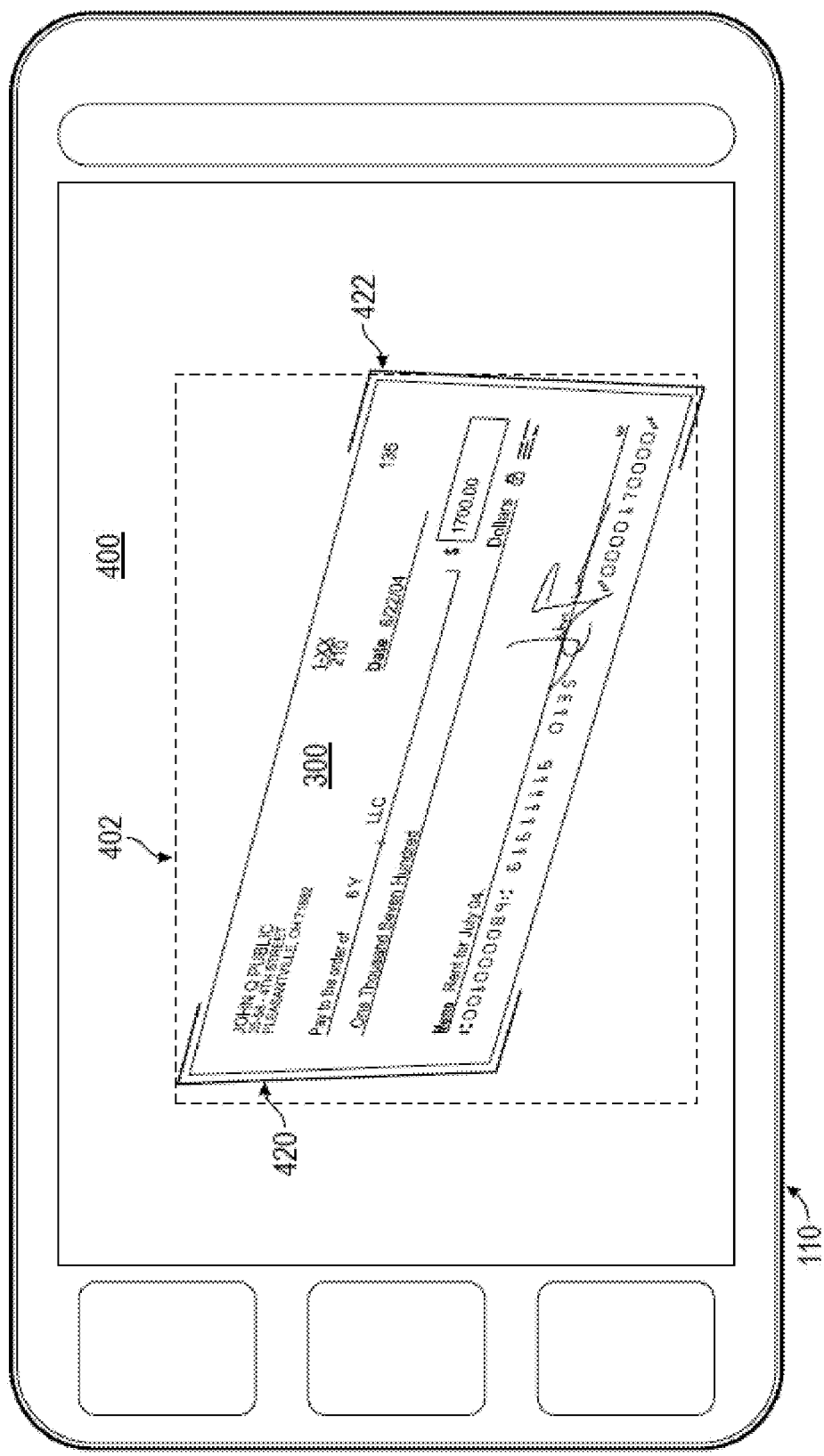

Referring now to FIG. 4C, yet another overlay of a client device 110 (or client device 810) presenting a graphical user interface 400 associated with a check 300 is provided in accordance with some embodiments. As is depicted, a sixth dynamic alignment indicator 420 and seventh dynamic alignment indicator 420 define a left and right portion of the check 300, according to edges or vertices of the check (e.g., edges 302 or vertices 304 of the check 300 in FIGS. 3A-3B). In some embodiments, such dynamic alignment indicators 420, 422 can be provided based on either of the check fields or the bounding box 402 (e.g., bounded by an area defined by the bounding box 402).

As is further depicted, a bounding box 402 is defined according to the image as provided in the feed. As indicated above, in some embodiments, the machine learning architecture can execute a computer vision engine 206 to generate a bounding box 402 relative to a transform (e.g., a spatial transform such as to align the check as depicted in FIG. 4A).

In such an embodiment, the bounding box 402 may appear, like the dynamic alignment indicators, to conform to the check.

Figure 4D:
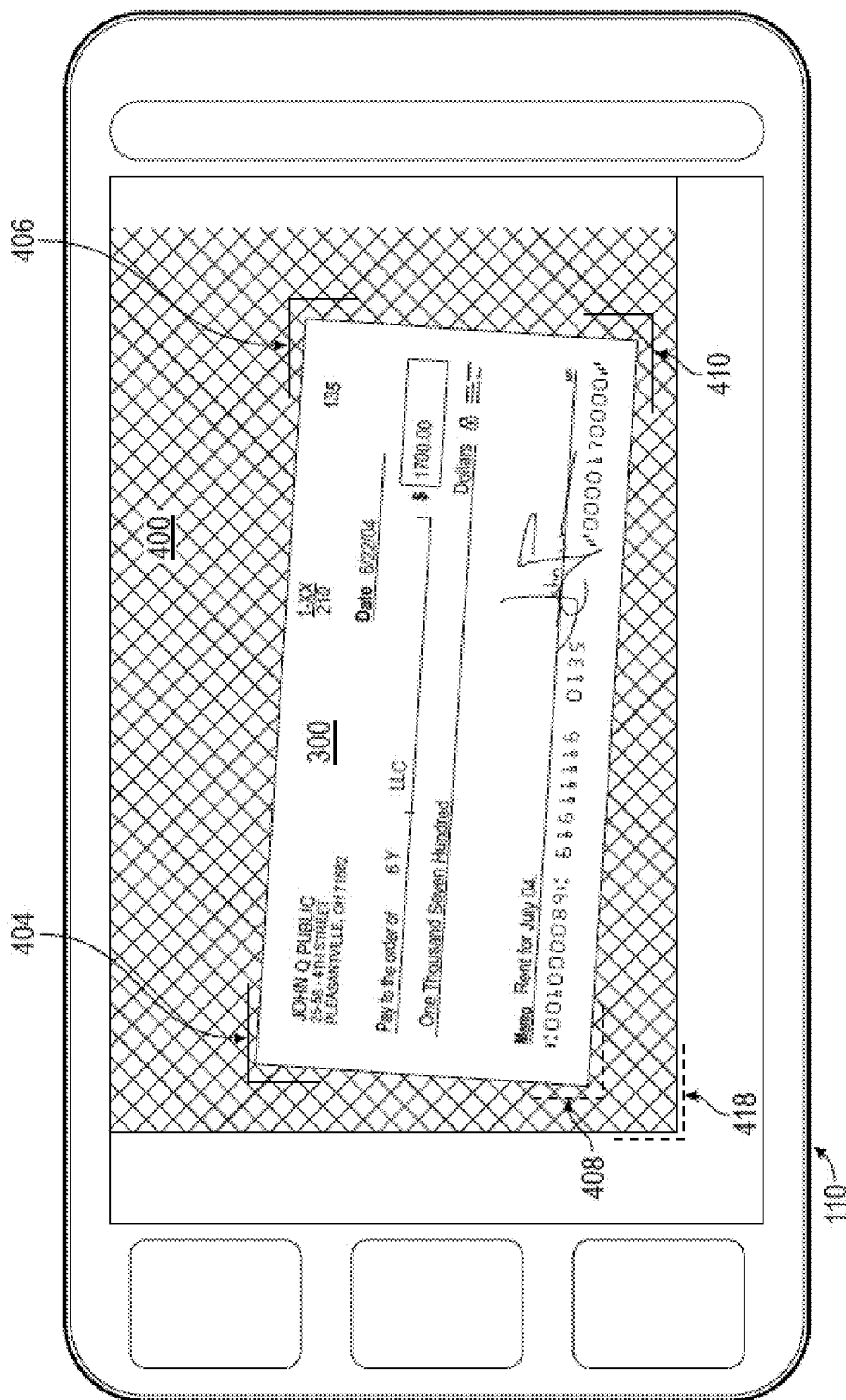

FIG. 4D depicts another overlay still of a client device 110 (or client device 810) presenting a graphical user interface 400 associated with a check 300, in accordance with some embodiments. The graphical user interface 400 is similar to the graphical user interface 400 of FIG. 4B, however, the presently depicted graphical user interface 400 depicts a prompt related to the dynamic alignment indicators. Particularly, the depicted graphical user interface 400 displays each of a third dynamic alignment indicator 408 and a fifth dynamic alignment indicator 418. As shown, the icons of the respective dynamic alignment indicators are shown with a decreased prominence corresponding to a confidence interval therefor. Such a depiction may prompt a user to select one of the depicted dynamic alignment indicators 408, 418. In some embodiments, the display can include explicit instructions to select a dynamic alignment indicator 408, 418, or the graphical user interface can elevate the prominence (e.g., by blinking or distinguishing color) to prompt the user to make the selection.

Figure 4E:
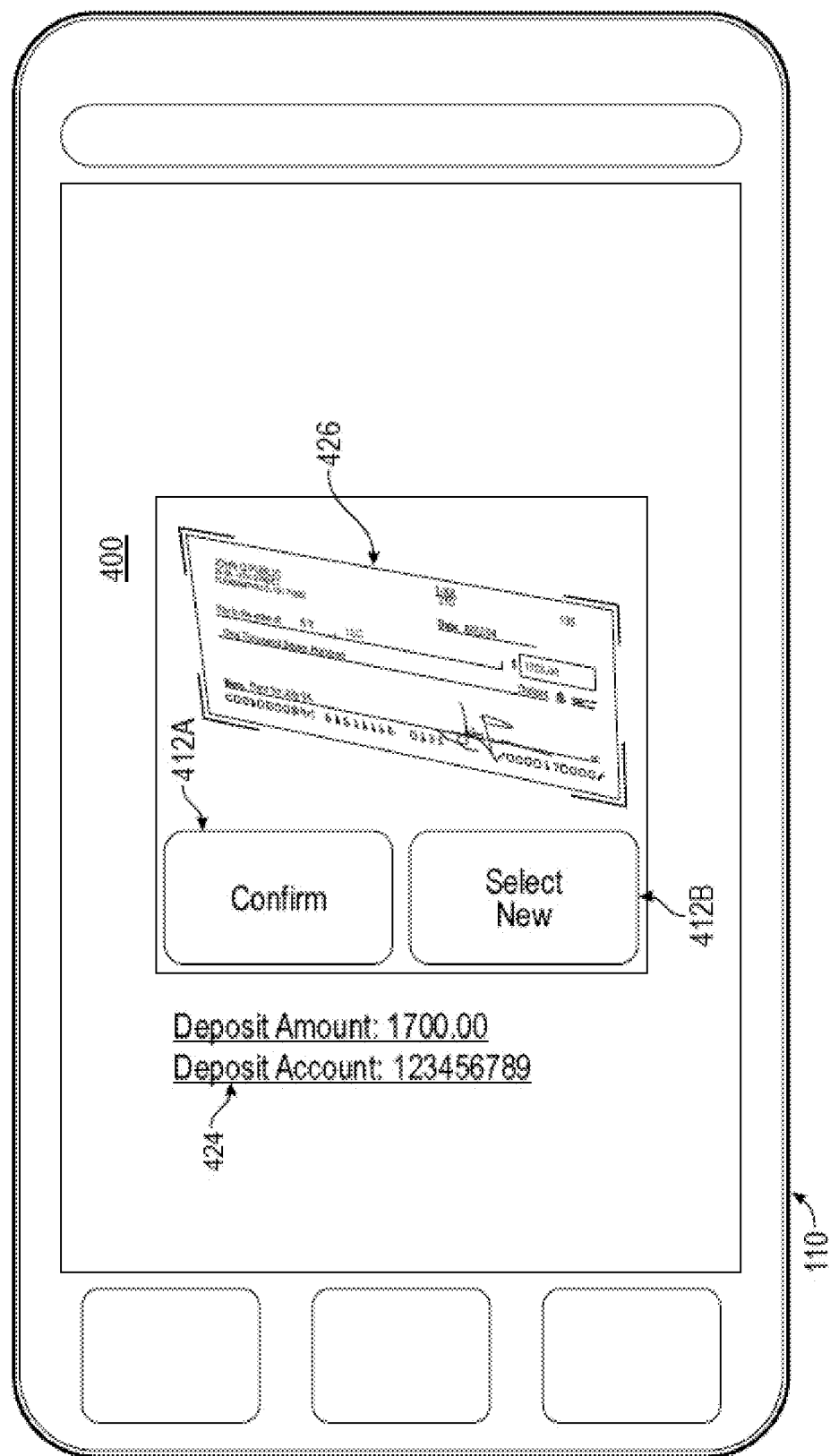

FIG. 4E depicts a further overlay of a client device 110 (or client device 810) presenting a graphical user interface 400 associated with a check 300, in accordance with some embodiments. The graphical user interface 400 provides an explicit prompt having a first control element 412a and second control element 412b corresponding thereto. The prompt further provides confirmatory content data 424 of the check. In some embodiments, the confirmatory content data 424 is entered manually by the user (e.g., via a keypad). In some embodiments, the confirmatory content data 424 us automatically generated based on the content data (e.g., via OCR). The user interface further includes a representative image 426 of the check 300, as further accompanied by dynamic alignment indicators which may, in other embodiments, be omitted.

Figure 5A:
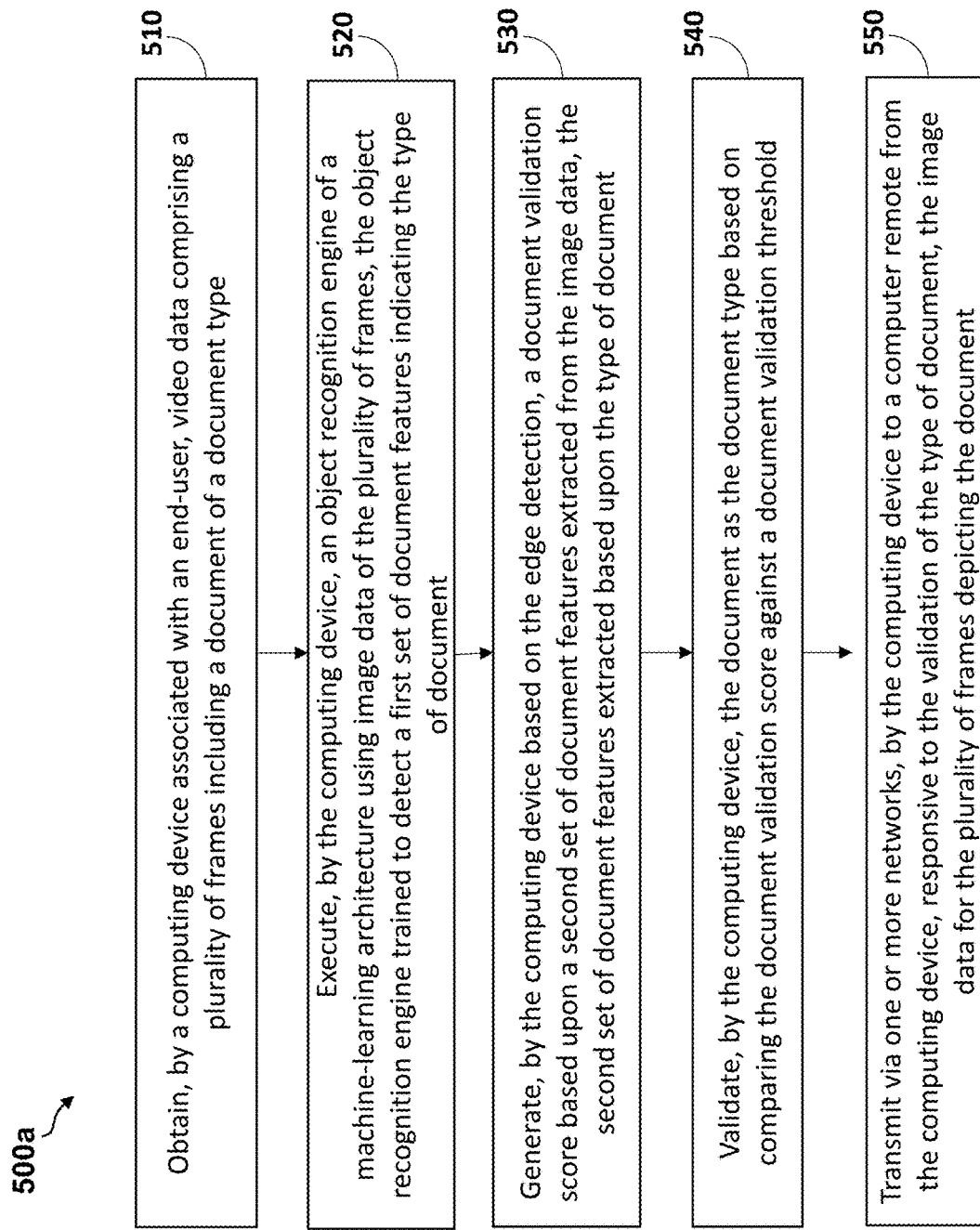
FIGS. 5A-5B are flowcharts illustrating operations of a method for locally, at a client computing device, validating a type of document included in image data intended for provision to a remote computing device, according to embodiments.

Referring more particularly to FIG. 5A, a flowchart illustrating operations of a method 500 for locally, at a computing device (e.g., client device 110, client device 810), validating a type of document included in image data intended for provision to a remote computing device (e.g., server 112, 130). The method 500 may include additional or fewer operations than shown. The operations shown may be performed in the order shown, in a different order, or concurrently. Operations of the method 500 are described as executed by a computing device associated with an end user (e.g., a client device 110, client device 810).

At operation 510, the computing device obtains video data including multiple frames including a document of a document type. For example, the document can include a financial instrument such as a check, wherein the type of documents can include the financial instrument type (e.g., the check). In various embodiments, the financial instrument type can refer to various genus or species of a document type. For example, where the financial instrument type corresponds to a check, the document type may refer to all checks, or a subset of checks. The subset of checks can refer to, for example, checks associated with a particular drawer (e.g., entity issuing the check) or drawee (e.g., the institution on which the check is drawn), or other classifications, such as personal checks, handwritten checks, pre-printed checks, checks including particular security features, or so forth.

In some embodiments, the computing device can generate the frames by activating a camera of the computing device. For example, the camera may be integral to the computing device, as in the case of a mobile device including a camera. In some embodiments, the computing device can attach to the camera (e.g., via a signed or run-time compiled driver, as may authenticate the local presence of the camera).

At operation 520, the computing device executes an object recognition engine of a machine-learning architecture using image data of the frames. The object recognition engine may be trained to detect a first set of document features indicating the type of document, such as edges of documents or various further features or content data. For example, the object recognition engine may be implemented as an edge detection engine, as may detect edges according to a Sobel operator, Canny edge detector, or other techniques (e.g., thresholding the boundary of the document, according to Otsu's, adaptive, multilevel, or other methods). In some embodiments, the object detection engine can detect various further content data, such as positions of fields, content data for the fields, or so forth. In some implementations, for example, the computing device may execute the object recognition engine of the machine-learning architecture using at least a portion of image data, of one or more frames of the video data, to detect the document type. The machine-learning architecture of the object recognition engine includes machine-learning models trained to, for example, detect the document type using a first set of document features indicating the type of document extracted using the image data, and generate a document validation score indicating a likelihood that the document is a valid document using a second set of document features extracted using the image data (as in later operation 530).

An edge detection model may be configured to detect multiple edges of a rectangle, (e.g., four edges, or less than four edges, wherein further edge(s) may be generated from the detected edges). The computing device can use the dimensions of the rectangle to validate the document as the document type (e.g., alone, or in combination with further extracted features). Such validation can be performed according to the execution of the machine learning model (e.g., where a validation score corresponds to an output layer of a network for the object recognition engine), or separate therefrom (e.g., according to a subsequent operation). In some embodiments, the subsequent operation can include comparing the dimensions of the rectangle to a predefined list of dimensions. For example, the predefined list may be for various document types or classes (e.g., the various drawers or drawees), as may be determined according to information from the image data, or as otherwise obtained by the computing device (e.g., via a user entry into a user interface). In some embodiments, the dimensions of the rectangle may be provided according to an arbitrary scale (e.g., without determining a depth of the document within the image data). In some embodiments, spatial dimensions (e.g., inches or millimeters) of the rectangle may be provided according to depth sensing performed according to LiDAR or dual camera processing, or other augmented reality techniques (e.g., visual-inertial odometry).

In some embodiments, the object recognition engine may be implemented as a classification model, to classify documents according to a document type. One or more layers of a network for the classifier may be trained to detect the edges of a rectangle corresponding to boundaries of the document, as may be implemented on a shallow hidden layer of a convolutional or other neural network. The validation of the documents as the document type (as is further referred to with regard to operation 540) may be based on, a classification performed by of the classification model. For example, the validation may be performed incident to the classification of the document as matching the document type, where the classification model classifies a object in image data as a type of document object (e.g., check). The classifier or other aspect of the machine-learning architecture may generate a document validation score indicating a likelihood or confidence or other indicia of that an input or inbound document in the image data matches to an valid (expected or registered) document, based on similar attributes, such as a MICR code, satisfying a document validation threshold.

The execution of the object recognition engine can include ingesting, by the object recognition engine, image data from the frames of the video data. For example, the image data may be provided as captured by the camera (e.g., to include local post-processing thereof), or may differ from frames of the video data, as captured. Such differences can include, for example, adjustments to brightness, contrast, or saturation as may improve detectability of text or other features of the document (e.g., anti-fraud features). In some embodiments, the computing device may generate a spatial transform to generate the image data from the video data. For example, the spatial transform can include a lateral translation, resizing, rotation, reflection, cropping, or de-skewing, relative to the video data generated at a camera of the computing device. For example, the computing device can be configured to de-skew or otherwise transform the document responsive to the detection of multiple of the edges. Such spatial transform operations may be performed by the object recognition engine (e.g., at a deeper layer than the detection of the edges), or external to the object recognition engine, such as via another component of the computing device (e.g., a deterministic skew corrector).

In some embodiments, the computing device identifies, based on the detected edges, various boundaries of the document. In some embodiment, the identification may be performed concurrently with the execution of the machine learning model (e.g., at operation 520). For example, as is indicated above, the identification of the boundary may be determined according to a determination of a rectangle defining a boundary of the document, or a classification model determining a class of a document as a particular document type (e.g., a check generally, a check of a drawee or drawer, type thereof, etc.). In some embodiments, the identification of the boundaries of the document is performed subsequent to the determination of the edges. For example, the determination of the edges can determine various edges including boundary edges, of the document, boundary edges of other objects such as a countertop or table, or edges between various fields of the document, such as the numerical amount field 314, written amount field 316, or MICR line 306 as are depicted in FIG. 3A. The subsequent identification can discriminate between the various internal edges (e.g., numerical amount field 314), external edges (e.g., a table edge), and boundary edges for the document (e.g., rectangular bounds of a rectangular check).

At operation 530, the computing device generates a document validation score based upon a second set of document features extracted from the image data. The second set of document features may be extracted based upon the type of document. For example, where the document is a check, the second set of document features can include check boundary dimensions, MICR line data, or other features associated with one or more fields of the check, various examples of which are provided throughout the present disclosure. In some embodiments, the computing device generates the validation score with a separate instance of an object recognition model. In some embodiments, the computing device generates the validation score according to an execution of a same instance of the object recognition model (e.g., a confidence score or other value for a classification). In some embodiments, the computing device generates the validation score using a deterministic technique executed subsequent to the execution of the object recognition engine.

In some embodiments, the validation score is generated according to a distance between the document and the document type. For example, a distance may refer to or include a distance of a spatial dimension (e.g., the boundary), or a distance within a non-spatial phase space. For example, the computing device can determine a hyperplane location corresponding to the document, and determine a cartesian, cosine, or other distance between the determined location and another location for the document type. For example, the other location for the document type can refer to a center point or other aspect of a cluster of other documents of the document type (as may be determined according to a k-means or Gaussian mixture model). In some embodiments, the distance can be determined based on all or a subset of document features or fields. For example, content data of a zip code field may be omitted in favor of a location or content of a MICR line.

In some embodiments, the computing device generates the validation score based upon identifying a first set of validation criteria corresponding to clerical or imaging errors. Using the illustrative example of a check, clerical errors can include omitted endorsement signatures or scrivener errors in dates or names, while imaging errors can include oversaturation, portions of document not legible or not included within video frames, or motion blur. For example, the first set of validation criteria may not correspond to an increase in fraud risk or may be readily addressable by an end-user (e.g., by endorsing the check, or recapturing video data). Accordingly, the computing device can convey the indication of the first set of validation criteria via presentation, via a user interface of the user device. For example, the computing device may generate a graphical user interface indicating any of the first set of validation criteria as were not validated. Such a presentation may cause the end-user to provide updated video data which may be validated (e.g., may lack the clerical or image errors), which may reduce compute load at a remote device. Further, such an indication can alert a user to an issue as may avoid delays in depositing a check or executing other documents (e.g., other financial instruments).

In some embodiments, the computing device generates the validation score based on identifying a second set of validation criteria (e.g., corresponding to digital or mechanical manipulation of the document). Unlike the first set of validation criteria, the second set of validation criteria may not be presented to a user (e.g., to avoid alerting a suspected fraudster to a forgery imperfection). Accordingly, the computing device can convey the second set of validation criteria to the computer without presentation to an end user (e.g., may omit presenting, via the user interface as described above with regard to the first set of validation criteria). For example, the computing device can convey the identification of the second validation criteria via encrypted communication with the computer, over the one or more networks of operation 550 (e.g., the Internet).

At operation 540, the computing device validates the document as a type of document. For example, the computing device can validate the document as the document type based on a comparison between the document validation score against a document validation threshold. In some embodiments, the document validation threshold can include a single value (e.g., ranging from 0 to 1 or 1 to 100). In some embodiments, the document validation score and a corresponding portion of the document validation threshold can include multiple constituent values, such as a first value corresponding to a spatial dimension of a boundary, a second value corresponding to a presence of a MICR field, and a third portion corresponding to a presence of a security feature. In some embodiments, the determination or components of the document validation score vary according to document type, such that the comparison can include multiple sub-operations as may each be provided with a separate weighting. For example, a document type corresponding to a check from a particular drawee may include a control number, or an alignment guide. The computing device can determine the document validation score based on the presence of such a feature. Further, the computing device can compare an indication of the presence to a threshold as a portion of the comparison between the document validation score to the document validation threshold to validate the document as the document type.

The comparison of the validation score can include comparing a match score for a match between the boundaries of the document (e.g., based on a comparison of dimensions of a rectangle corresponding to the document to a predefined set of document dimensions. For example, a data structure (e.g., look-up-table, LUT or range mapping table for the rectangle dimensions) can include dimensions (or ranges thereof) corresponding to one or more document types to validate the document. As indicated above, the matched document type can correspond to various issuers (e.g., drawers or drawees). That is, the match can include matching the identified boundaries to a predefined dimension (e.g., a set thereof) of various predefined dimensions having predefined or expected boundaries corresponding to predefined or expected edges, the various predefined dimensions corresponding to various document issuers. Each of the predefined dimensions can correspond to at least one separate predefined issuer.

In some embodiments, multiple validation thresholds are provided. For example, a first threshold can correspond to warning generation (e.g., warning threshold) or alert trigger, which triggers or instructs a computing device to generate an alert or warning indicator for presentation to a user via a user interface. The warning can prompt a user to retain the document, or recapture the obtained video data, however, the end-user may acknowledge the warning (e.g., by selecting a prompt of a notification presented to the user via a user interface) and proceed to operation 550. A second threshold can correspond to non-validation. Accordingly, the computing device can generate the graphical user interface including an indication of the comparison to the first threshold (e.g., a warning prompt or other notification) or the second threshold (e.g., an indication of non-validation, as may be accompanied by instructions associated with particular validation criteria, such as instructions to endorse a check, place the document on a high-contrast background, adjust lighting, or so forth).

In some embodiments, the validation can include any of various further operations, such as any of the various techniques described herein, such as generation of further instances of document validation scores or components thereof (e.g., ranged components, such as ranging from 0 to 1 or binary components such as pass/fail criteria) and comparison to thresholds, or other validation operations or matches. For example, the validation can include validating a content, legibility, or presence of various fields of the document type, or other content or features thereof. The computing device can validate the document as the type of document, at least in part, by determining that the image data substantially consists of the document. For example, the computing device can identify a subset of the video data (or image data) including the document and compare the subset to an occupancy threshold to validate the document.

At operation 550, the computing device transmits, to a computer remote from the computing device (e.g., the computing device 230), the image data for the frames depicting the document. The computing device transmits the image data responsive to the validation of the type of document. The computing device can transmit the image data via one or more networks, such as a public network, private network, local network, wide area network, etc. For example, the computing device can couple with the computing device 230 and transmit the image data via the internet, a cellular connection of a mobile device, or various other public or private networks.

In some embodiments the image data transmitted to the computer is transmitted in a video feed comprising multiple of the plurality of frames of the video data. That, is all or a portion of the video feed may be provided to the computer, as may aid the computer to conduct liveness checks or other validations. In some embodiments, the portion of the video feed may be selected based on local validations. For example, the computing device can determine that a subset of the video data includes all fields or boundaries of the document in sufficient clarity/legibility, and thus provide the subset, as may reduce data transmission latency, processing, and otherwise aid remote processing of the data upon its receipt by the computer. Such determinations may further reduce a battery draw/energy usage or medium access contention at the computing device, as corresponding to a reduced active time of a transceiver of the computing device.

Figure 5B:
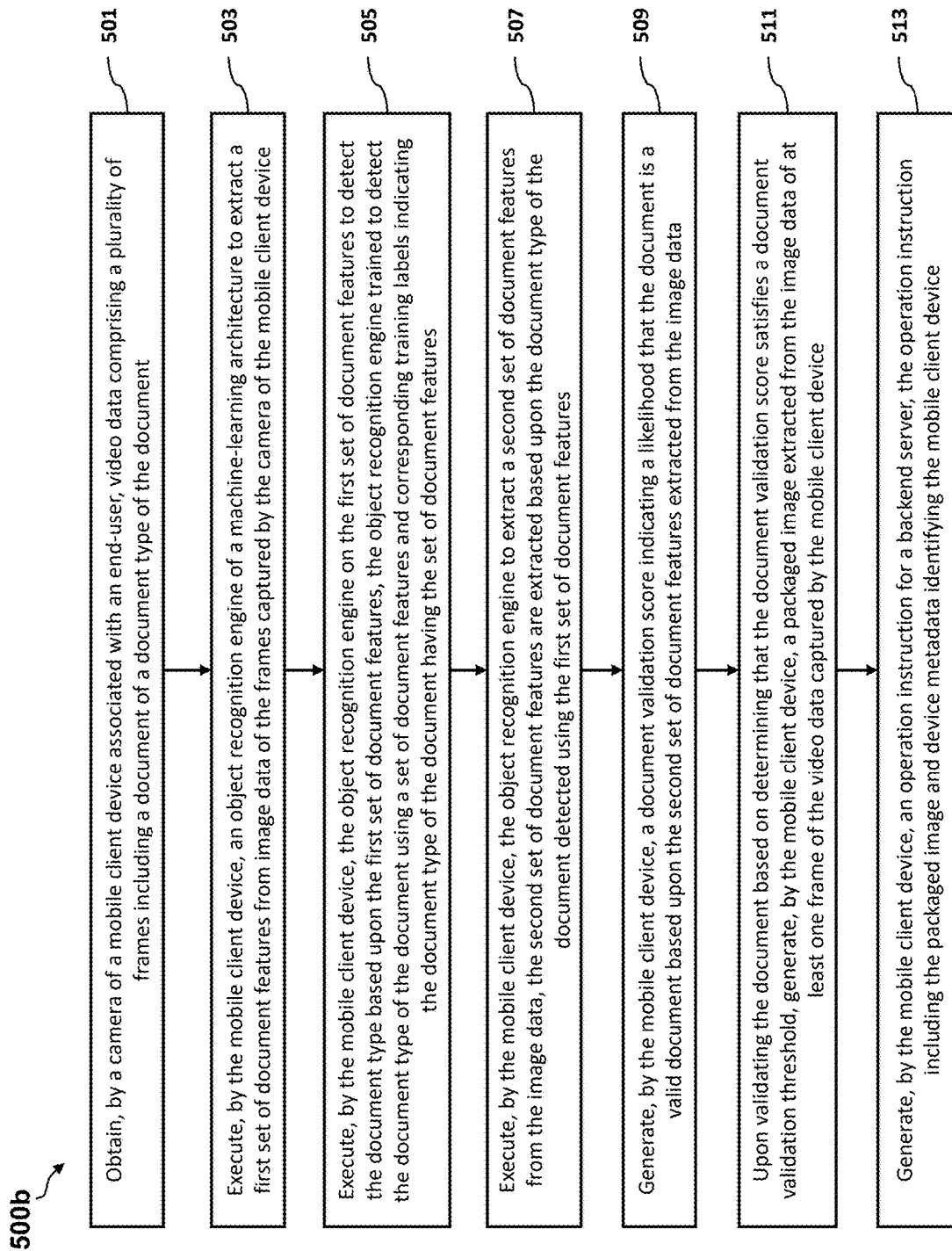

FIG. 5B is a flowchart of an example method 500b as an example implementation of the method 500a in FIG. 5A, as a method 500b for client-side validation of document-imagery for remote processing and validating a type of document included in image data intended for a user-requested operation for a remote backend server or other computing device (e.g., servers 112, 130). The method 500b may include additional or fewer operations than shown. The operations shown may be performed in the order shown, in a different order, or concurrently. Operations of the method 500b are described as executed by a computing device associated with an end user (e.g., a client device 110, client device 810).

At operation 501, obtaining, by a camera of a mobile client device associated with an end-user (e.g., a client device 110, client device 810), video data comprising a plurality of frames including a document of a document type of the document. At operation 503, executing, by the mobile client device, an object recognition engine of a machine-learning architecture to extract a first set of document features from image data of the plurality of frames captured by the camera of the mobile client device.

At operation 505, executing, by the mobile client device, the object recognition engine on the first set of document features to detect the document type of the document based upon the first set of document features, the object recognition engine trained to detect the document type of the document using a set of document features and corresponding training labels indicating the document type of the document having the set of document features.

At operation 507, executing, by the mobile client device, the object recognition engine to extract a second set of document features from the image data, the second set of document features are extracted based upon the document type of the document detected using the first set of document features.

At operation 509, generating, by the mobile client device, a document validation score indicating a likelihood that the document is a valid document based upon the second set of document features extracted from the image data.

At operation 511, upon validating the document based on determining that the document validation score satisfies a document validation threshold, generating, by the mobile client device, a packaged image extracted from the image data of at least one frame of the plurality of frames of the video data captured by the mobile client device. At operation 513, generating, by the mobile client device, an operation instruction for a backend server, the operation instruction including the packaged image and device metadata identifying the mobile client device.

Figure 6A:
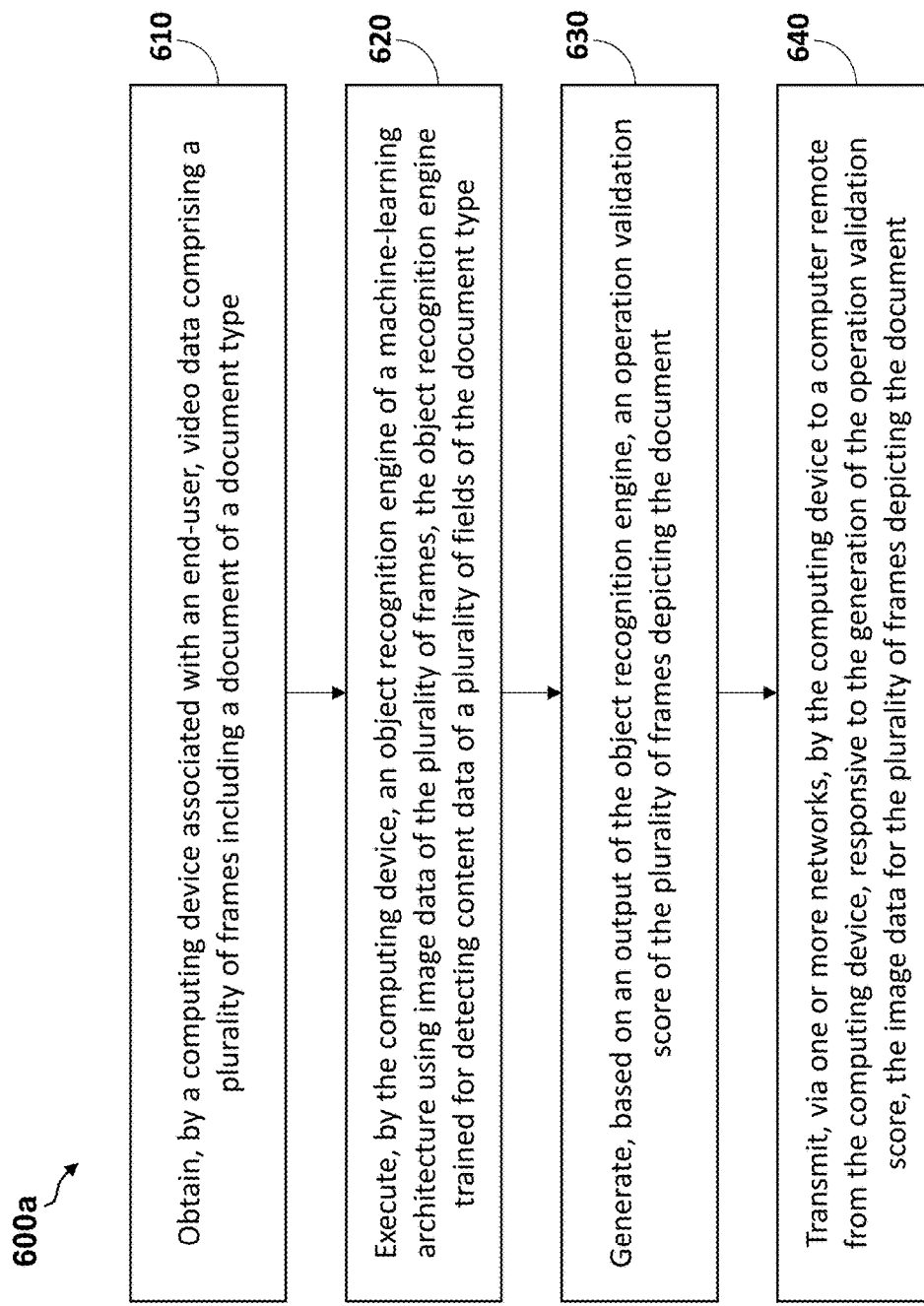
FIGS. 6A-6B are flowcharts illustrating operations of a method for locally validating features of a document, at a computing device associated with a user in image data intended for provision to a remote computing device, according to embodiments.

FIG. 6A is a flowchart illustrating operations of a method 600a for validating features of a document, at a computing device associated with a user (e.g., client device 110, client device 810) in image data intended for provision to a remote computing device (e.g., server 112, 130). The method 600a may include additional or fewer operations than shown. The operations shown may be performed in the order shown, in a different order, or concurrently.

At operation 610, the computing device obtains video data including multiple frames including a document of a document type. For example, the computing device (e.g., mobile phone) can generate or otherwise obtain the video data as described with regard to operation 510 of the previously described method 500a, or as otherwise provided according to the present disclosure.

At operation 620, the computing device executes an object recognition engine of a machine-learning architecture using image data of the plurality of frames. The machine learning model may be trained for detecting content data of a plurality of fields of the document type. For example, the machine learning model may be trained to determine a legibility of various fields of the document, or to determine content data from text or other features of the various fields. Accordingly, the computing device can execute the machine learning model to determine a legibility of one or more fields of the document. In some embodiments, the legibility is determined incident to detecting content data (e.g., textual content), though the determination of the legibility need not include determining the content. For example, the determination of legibility can be performed as distinct from detecting OCR or other techniques to determine content data. In some embodiments, the computing device can determine the eligibility (or extract textual or other data) based on selection criteria specific to a field type of the document. For example, the computing device can determine a legibility of a signature according to first criteria (e.g., stroke continuity, shape symmetry, stroke direction, line curvature, pen lifts, etc.). The computing device can determine a legibility of a numeric field, such as the numerical amount field 314 of FIG. 3A, according to second criteria (e.g., a match to numeric characters). The computing device can determine a legibility of another textual field, such as the written amount field 316 of FIG. 3A, according to third criteria (e.g., a match to alphanumeric or alphabetic characters).

At operation 630, the computing device generates an operation validation score of the plurality of frames depicting the document, based on an output of the object recognition engine. In some instances, the operation validation score can be generated as a binary indicator (e.g., 1/0 or pass/fail). In some instances, the operation validation score can be determined according to a range. For example, the score can range from zero to one, from one to one hundred, etc. In some instances, the operation validation score can include constituent scores relating to particular aspects of validation. For example, the operation validation score can include (or correspond to) constituent (or other) scores, such as image quality scores, digital manipulation scores, mechanical manipulation scores, legibility scores, fidelity scores, congruence scores, or so forth.

In some embodiments the computing device can determine a content similarity or congruence score indicating a congruence between first data of a first content field of the document and second data, differing from the first data, of a second content field of the document. For example, the computing device can determine a degree of congruency (or similarities) between content data of a content field such as a numerical amount field (an illustrative example of which is depicted in FIG. 3A) and content data of another content field such as a written amount field (an illustrative example of which is also depicted in FIG. 3A). The computing system can determine, for example, that a string of "five hundred and eleven" in the written field is congruent to a numeric field of "$511.00". That is, the congruency check can be performed on content data extracted from the image data. Such a congruency check can capture incongruencies, such as detection of a slashed seven as a 4, or a null character (Ø) as an eight, rather than a zero. Such an illustrative example should not be construed as limiting. In various embodiments, the computing system can verify various other congruencies, such as a congruency between MICR and other data (e.g., a drawer or drawee). Such a congruency test may be performed to validate the document, such that documents which may not be validated upon their conveyance to the computing device 230 or a remote provider server 112 may be determined as non-validated (or likely to be non-validated) at time of data entry, such that a user can be prompted to obtain (e.g., generate) further video data, correct minor errors, or be aware that the execution of the document may be delayed or rejected (e.g., to avoid potential overdrafts).

In some embodiments, the computing device is configured to detect an omission of one or more fields of the document. For example, the computing device can detect a lack of an endorsement or other content data associated with other fields of the document. The computing device can generate a graphical user interface for presenting an indication of the omission via the graphical user interface. For example, the omission may be detected prior to a (e.g., second) execution of operation 610, such that the video data of operation 610 is captured subsequently to the presentation of the GUI. That is, the user can correct the omission and cause the computing device to begin (e.g., repeat operations of) the present method 600a. For example, the computing device can detect that no endorsement is present, or than only one endorsement is present for a check payable to a first AND second party.

In some embodiments, the computing device can generate the operation validation score by determining a first validation score for the documents and comparing the first validation score to one or more thresholds. For example, the computing device can compare the first validation score to a first threshold corresponding to non-validation, as well as to a second threshold corresponding to warning generation, as described above with regard to operation 540 of the previously described method 500a. More generally, in some embodiments, the GUI can be configured to receive an indication to proceed without further data. For example, the drawer of an instrument may not have filled a memo field, but the end-user may wish to proceed with the deposit, as the drawer may not be available to complete the field. However, the notification can alert the user to retain the instrument and be aware that a delay or rejection in processing may occur.

In some embodiments, the computing device can identify separate sets of validation criteria as described above with regard to operation 540 of the previously described method 500a. For example, the computing device can identify a first set of validation criteria corresponding to clerical or imaging errors and identify a second set of validation criteria corresponding to digital or mechanical manipulation of the document. The computing device can proceed to, upon identification, convey the identification of the first set of validation criteria via presentation, via a user interface of the computing device or the second set of validation criteria via encrypted communication with the computer (e.g., without presentation via the user interface of the computing device).

In some embodiments, the computing device can determine further elements of, or aspects related to, the operation validation score. For example, the computing device can predict a quality score for the document using multiple of the one or more images (e.g., according to a maximum, average, or other quality score for one or more scores of the various images/frames). The computing device can compare the quality score to a quality threshold to determine the operation validation score.

At operation 640, the computing device transmits the image data for the frames depicting the document, via one or more networks, to a remote computer (e.g., server 112, 130) that is remote from the computing device (e.g., client device 110, client device 810). The computing device can transmit the image data responsive to the validation of the type of document. For example, the computing device (e.g., mobile phone) can transmit the image data as described with regard to operation 550 of the previously described method 500a, or as otherwise provided according to the present disclosure.

Figure 6B:
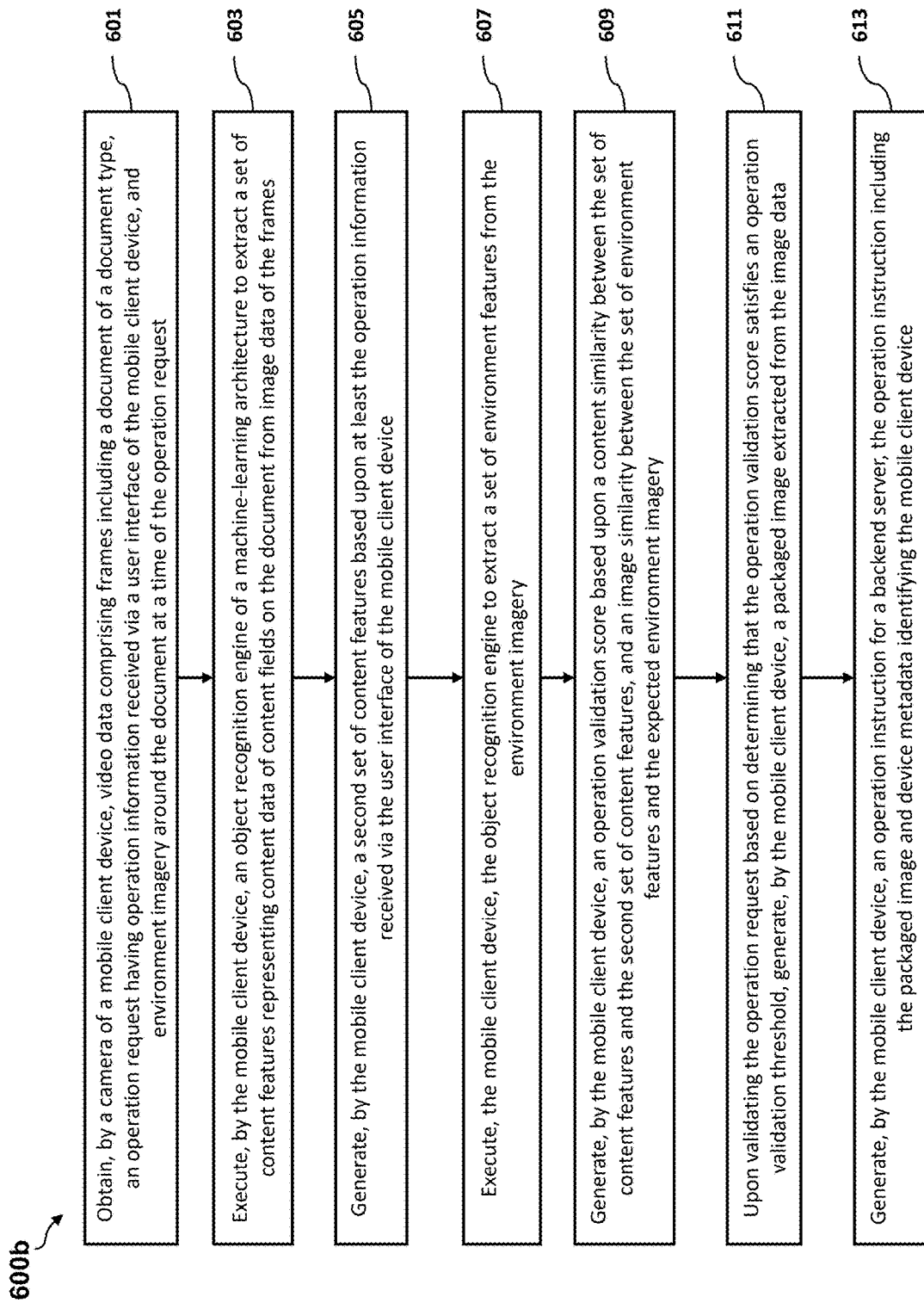

FIG. 6B is a flowchart of an example method 600b as an example implementation of the method 600a in FIG. 6A, as method 600b for client-side validation of document-imagery, at a mobile client device (e.g., client device 110, client device 810) for remote processing and validating an operation request associated with image data intended for the user-requested operation for a remote backend server or other computing device (e.g., server 112, 130). The method 600b may include additional or fewer operations than shown. The operations shown may be performed in the order shown, in a different order, or concurrently. Operations of the method 600b are described as executed by a computing device associated with an end user (e.g., a client device 110, client device 810).

At operation 601, obtaining, by a camera of a mobile client device associated with an end-user, video data comprising a plurality of frames including a document of a document type, an operation request having operation information received via a user interface of the mobile client device, and environment imagery about the document at a time of the operation request.

At operation 603, executing, by the mobile client device, an object recognition engine of a machine-learning architecture to extract a set of content features representing content data of a plurality of content fields on the document from image data of a portion of the plurality of frames, the object recognition engine trained for detecting the plurality of content fields for the document type and the content data of the plurality of content fields.

At operation 605, generating, by the mobile client device, a second set of content features based upon at least the operation information received via the user interface of the mobile client device.

At operation 607, executing, the mobile client device, the object recognition engine to extract a set of environment features from the environment imagery, the object recognition engine trained for detecting the set of environment features using the environment imagery and corresponding training labels indicating expected environment imagery.

At operation 609, generating, by the mobile client device, an operation validation score based upon a content similarity between the set of content features and the second set of content features, and an image similarity between the set of environment features and the expected environment imagery, the operation validation score indicating a likelihood that the document is a valid document and is associated with the operation request]

At operation 611, upon validating the operation request based on determining that the operation validation score satisfies an operation validation threshold, generating, by the mobile client device, a packaged image extracted from the image data of at least one frame of the plurality of frames of the video data captured by the mobile client device. At operation 613, generating, by the mobile client device, an operation instruction for a backend server, the operation instruction including the packaged image and device metadata identifying the mobile client device.

Figure 7A:
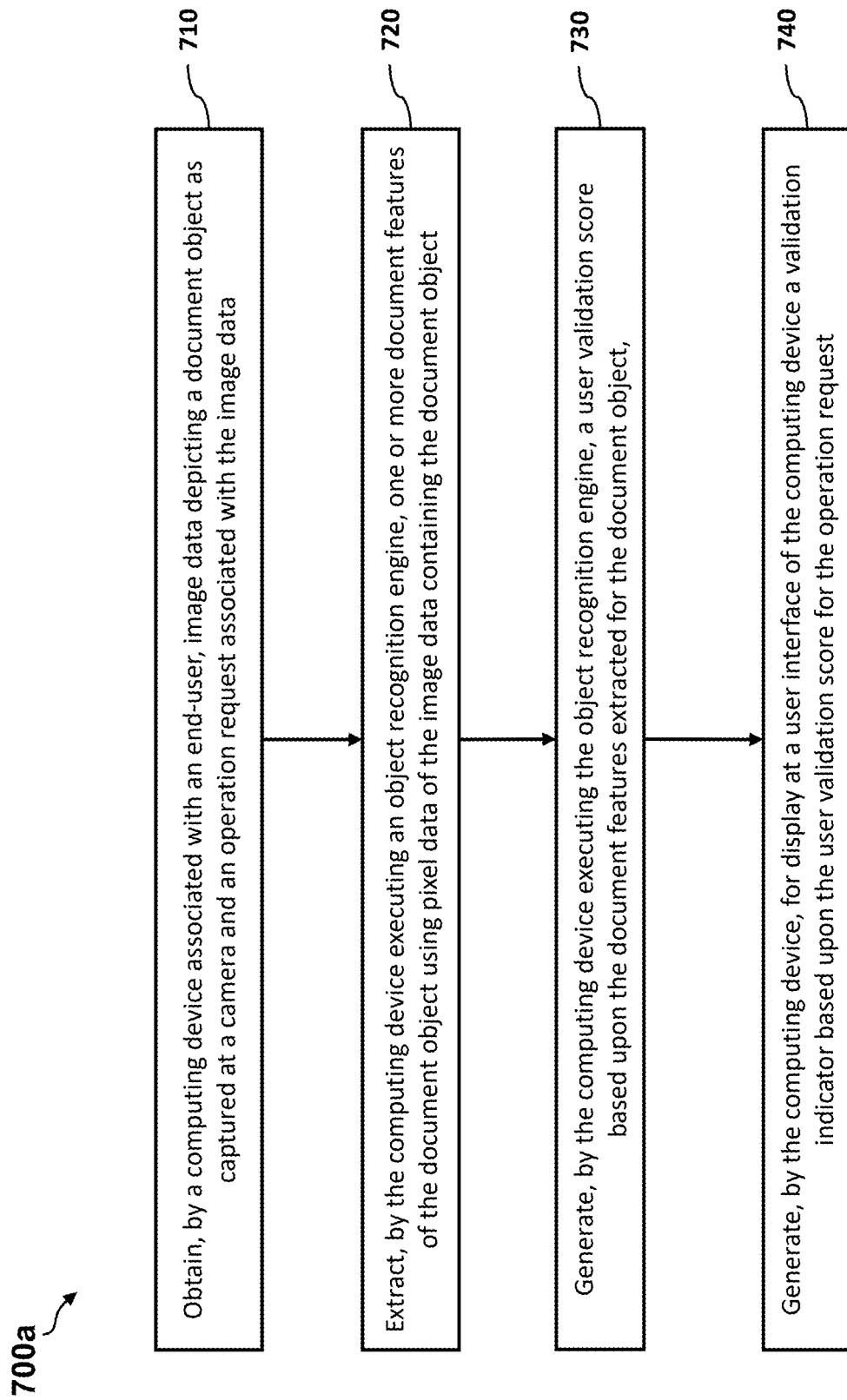
FIGS. 7A-7B are flowcharts illustrating operations of a method for client-side input validation for remote processing of document imagery at a client computing device, in accordance with some embodiments.

FIG. 7A is flowchart illustrating operations of a method 700a for client-side input validation for remote processing of document imagery at a client computing device (e.g., client device 110, client device 810), in accordance with some embodiments. The method 700a includes a computing device associated with an end-user (e.g., client device 110, client device 810) that executes a machine-learning architecture having machine-learning models or machine-learning techniques trains for recognizing types of documents and document features for validating an end-user as being an expected a registered customer expected to be associated with a particular document based upon the document images or document features. For instance, a client-side AI/ML-based object recognition engine may be trained to recognize features of a document or portion of the document (e.g., check or portion of the check) for a given end-user customer, and then validate whether a later inbound or input document was actually received from the registered or expected end-user customer. The object recognition engine may output a transaction or user validation score (or other types of values) indicating a predicted likelihood that the registered end-user customer is the registered user who is attempting to submit the input or inbound document.

In some embodiments, a central server or the computing device (or any other computing device) may train or re-train aspects of the machine-learning architecture of the object recognition engine. The object recognition engine may be trained for detecting the document features of the document object based upon a training dataset comprising a plurality of training document images and training labels corresponding to the training document images, or other expected types of information (e.g., expected environment imagery). Each particular training label may indicate the type of document of the corresponding document image for supervised or semi-supervised learning performed by the central server or the computing device executing a loss function. The object recognition engine may be trained for generating the user validation score based upon a training dataset comprising a plurality of prior document images associated with the expected registered user corresponding to a plurality of training labels. Each particular training label indicates, for example, at least one of a user identifier associated with the corresponding prior document image or the document features of the corresponding prior document image for supervised or semi-supervised learning performed by the central server or the computing device executing the same or different loss function.

At operation 710, the computing device obtains image data depicting a document object as captured at a camera and an operation request associated with the image data. The operation request is based upon an end-user input entered at the user interface of the computing device, which may include an input indicating a user instruction or selection. For instance, the operation request may instruct the computing device to capture image data (e.g., video feed of frames; one or more images) containing a document object. The computing device may obtain (e.g., retrieve, receive) the image data from a camera coupled to the computing device or from a non-transitory storage medium of the computing device. In some cases, the computing device may obtain the image data by receiving a video feed from the camera comprising a plurality of frames, where these frames may include one or more frames that contain the image data depicting the object.

The operation request may include an instruction for the computing device to perform one or more operations using the image document object, such as updating an account value based upon a deposit operation or executing a backend value exchange between backend servers or accounts based upon a transfer operation. In some cases, the computing device obtains the operation request by receiving by the operation request, via the user interface of the computing device, where the operation request indicates the requested operation to be performed.

At operation 720, the computing device extracts one or more document features of the document object using pixel data of the image data containing the document object. The computing device may execute a machine-learning model of the object recognition engine having parameters trained for extracting the document features.

At operation 730, the computing device executes the object recognition engine to generate a user validation score based upon the document features extracted for the document object. The machine-learning architecture of the object recognition engine includes one or more machine-learning models trained for detecting or recognizing the document features of the document object. The machine-learning architecture of the object recognition engine may include one or more machine-learning models trained for generating a user validation score indicating a likelihood that the end-user is a registered user according to the document features and/or a recognized document object.

In some embodiments, the computing device obtains image data for the document object by parsing a portion of pixel data of the image data that contains a portion of the document object. The computing device may extract the one or more document features of the document object using the portion of the pixel data. The computing device may then generate the user validation score based upon the document features extracted for the particular portion of the document object.

At operation 740, the computing device generates a validation indicator for display at a user interface of the computing device. The computing device generates the validation indicator based upon the user validation score for the operation request, where the validation indicator may indicate to the end-user or other user (e.g., system administrator) whether the computing device successfully validated the end-user as the registered user or unsuccessfully validated (or rejected) the end-user. The computing device may determine whether to validate the user based upon, for example, comparing the user validation score against a user validation threshold score.

Figure 7B:
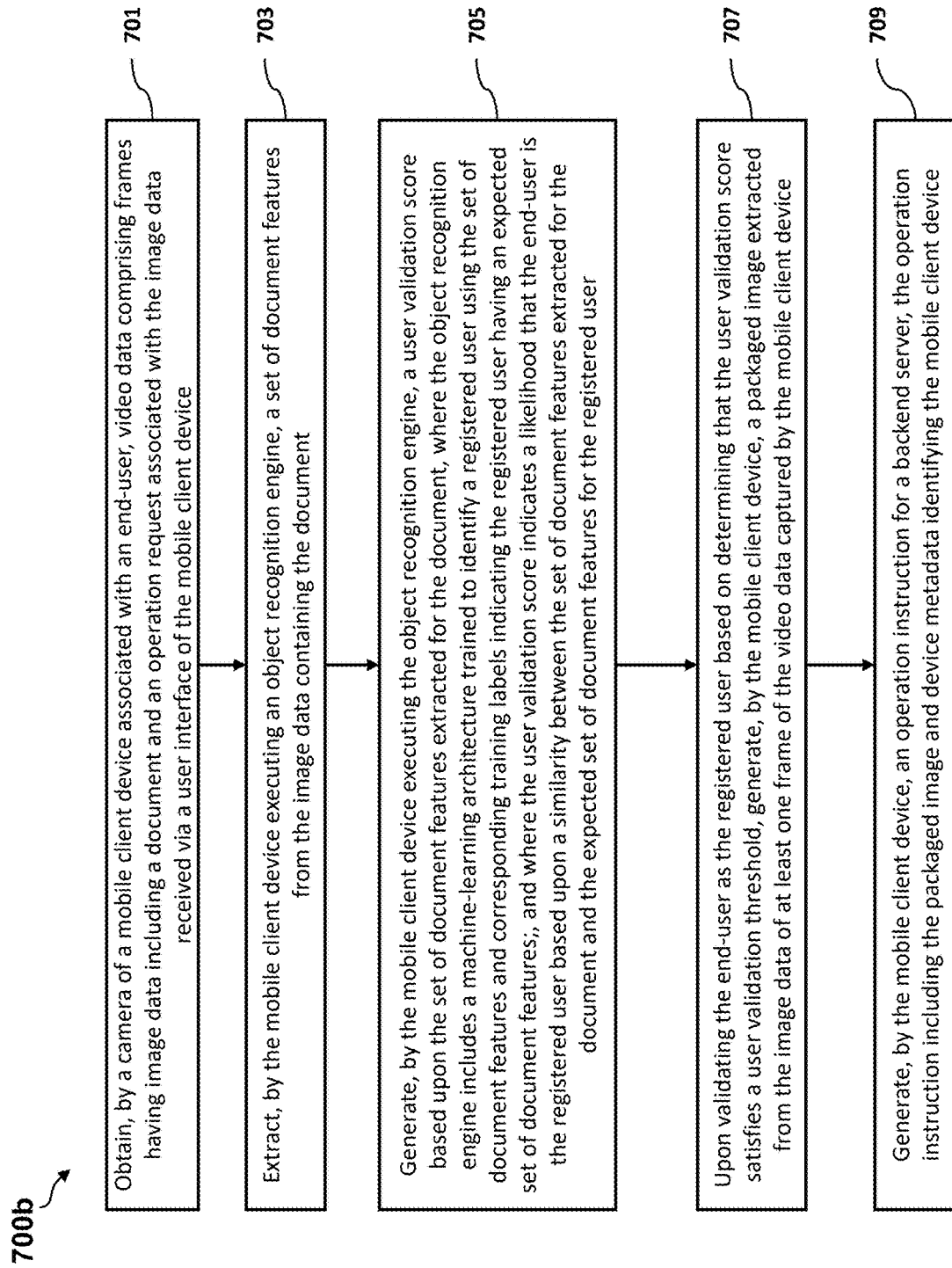

FIG. 7B is a flowchart of an example method 700b as an example implementation of the method 700a in FIG. 7A, as method 700b for client-side validation of document-imagery at a mobile computing device associated with an end-user (e.g., client device 110, client device 810) for remote processing and validating an end-user associated with a user-requested operation for a remote backend server or other computing device (e.g., server 112, 130).

At operation 701, obtaining, by a camera of a mobile client device associated with an end-user (e.g., client device 110, client device 810), video data comprising a plurality of frames having image data including a document and an operation request associated with the image data received via a user interface of the mobile client device. At operation 703, extracting, by the mobile client device executing an object recognition engine, a set of document features from the image data containing the document.

At operation 705, generating, by the mobile client device executing the object recognition engine, a user validation score based upon the set of document features extracted for the document. The object recognition engine includes a machine-learning architecture trained to identify a registered user using the set of document features and corresponding training labels indicating the registered user having an expected set of document features, the user validation score indicating a likelihood that the end-user is the registered user based upon a similarity between the set of document features extracted for the document and the expected set of document features for the registered user.

At operation 707, upon validating the end-user as the registered user based on determining that the user validation score satisfies a user validation threshold, generating, by the mobile client device, a packaged image extracted from the image data of at least one frame of the plurality of frames of the video data captured by the mobile client device.

At operation 709, generating, by the mobile client device, an operation instruction for a backend server, the operation instruction including the packaged image and device metadata identifying the mobile client device.

Figure 8:
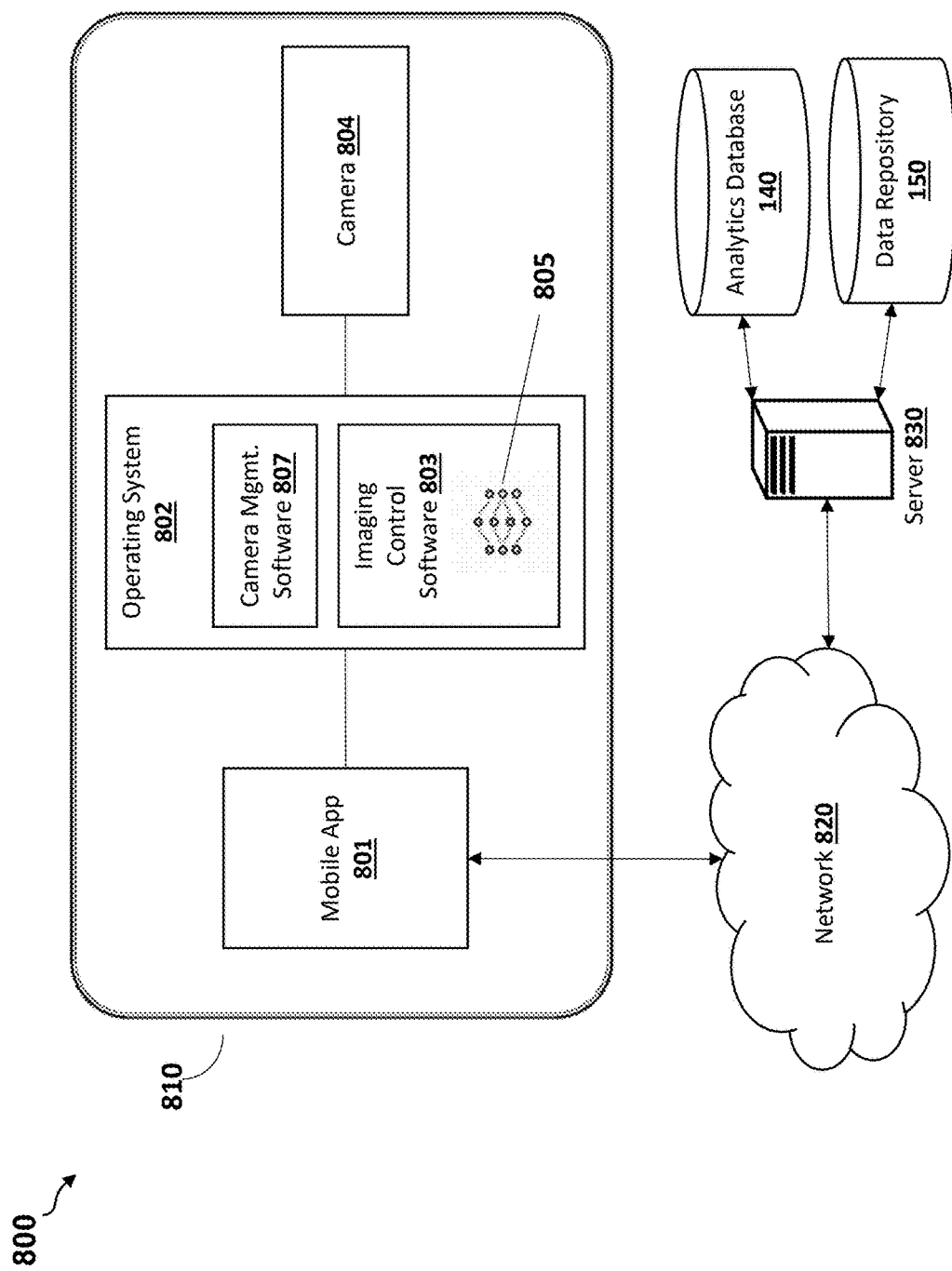
FIG. 8 shows dataflow amongst components of a system for client-side imagery processing using machine-learning models, according to some embodiments.

FIG. 8 shows dataflow amongst components of a system 800 for client-side imagery processing using machine-learning models, according to some embodiments. The system 800 includes a client device 810 (e.g., client device 110, computing device 230) in network communication with a server 830 (sometimes referred to as a "backend server") (e.g., server 130) via one or more networks 820 (e.g., networks 820). The server 830 may be in network communication with one or more databases 140, 150. For example, the server 830 can be in network communication with one or more analytics databases 840 or data repositories 850. The client device 810 includes software components, such as a mobile app 801 and an operating system 802 including imaging control software 803, and hardware components, such a processor, non-transitory machine-readable storage, and a camera 804.

The various devices of the system 800 can exchange information over a network 820. The network 820 can include a local network 820 and/or another network 820, such as a mobile telephone network 820. The (e.g., local) network 820 may employ various network topologies such as Wi-Fi networks based on any one of the Institute of Electrical and Electronics Engineers ("IEEE") 802.11 standards, wired networks based on any of the IEEE 802.3 networks, and so forth. For example, the network 820 can include Bluetooth, Direct Subscriber Line (DSL), Data Over Cable Service Interface Specification (DOCSIS), or satellite communications. Communicative connections over the network 820 can include a first link employing a first network topology or protocol and a second link employing a second network topology or protocol. The network 820 may include any number of security devices or logical arrangements (e.g., firewalls, proxy servers, DMZs) to monitor or otherwise manage network traffic. Security devices may be configured to analyze, accept, or reject data exchanges with any of various client devices 810, provider servers 812, servers 830, or databases 140, 150. In some embodiments, the security device may be a physical device (e.g., a firewall). Additionally or alternatively, the security device may be a software application (e.g., Web Application Firewall (WAF)) that is hosted on, or otherwise integrated into, another computing device of the system 800.

The client device 810 may be any electronic device comprising hardware (e.g., at least one processor, non-transitory machine-readable storage medium) and software components capable of performing the various tasks and processes described herein. Non-limiting examples of the client device 810 may include mobile client devices (e.g., mobile phones), tablets, gaming consoles, laptops, smart watches, desktop computers, and personal computers, among others, which may be owned or used by a user. The client device 810 may include a processor, non-transitory memory, user interface devices (e.g., display screen), and network interface. The client device 810 may execute software programming for generating and updating an interactive graphical user interface (e.g., graphical user interface 400), presented at a display screen (e.g., touchscreen) of the client device 810. The network interface includes hardware and software components for the client device 810 to communicate over the network 820. The components and operations of the network interface may be based on the type of client device 810 and how the client device 810 interfaces with the network 820. For example, if the client device 810 is a mobile phone or tablet, the network interface may include a transmitter, receiver, or transceiver with an antenna for sending and receiving wireless transmissions to or from the other devices of the system 800.

The client device 810 includes a native operating system 802 having software routines for managing various hardware and software components, including the camera 804. A kernel manages system resources, including the processor, memory, and input/output devices, acting as a bridge between hardware and software for efficient communication and coordination. Device drivers are software programs that allow the operating system 802 to interact with hardware components, such as the camera 804, translating operating system commands into specific actions performed by the hardware. Application frameworks provide a set of APIs and software libraries for developers to build applications that can interact with hardware and software components of the client device 810, including components for managing user interfaces, accessing sensors, and handling multimedia data. The operating system 802 includes executable services or background processes that perform various tasks, including network management, power management, and security protocols.

In some cases, the operating system 802 may include camera drivers or image control software 803 for initializing and controlling the camera hardware, handling tasks such as adjusting focus, exposure, and capturing images or video data, and translating operating system commands into specific actions performed by the camera. The operating system 802 provides a set of APIs that allow applications to interact with the camera 804, enabling developers to access camera functionalities such as taking pictures, recording videos, and applying filters or effects. Image processing components within the operating system 802 manage the data captured by the camera 804, performing tasks such as compressing image data, enhancing image quality, and extracting features from the captured images. This optimization of image data is beneficial for storage and transmission. The operating system 802 includes software components for controlling the camera 804, managing camera settings such as resolution, frame rate, and image stabilization, and ensuring the camera operates according to user preferences and application requirements.

The image control software 803 (e.g., Apple VisionKit®) of the operating system 802 includes software routines or tools and APIs to perform various processes that derive certain types of information about the media data. In some cases, the operating system 802 includes camera management software 807 (e.g., AVFoundation) for performing operations to manage and control the camera 804 of a client device 810. The image control software 803, for example, handles various processes associated with capturing and processing media data, including images and videos. The camera management software 807, for example, handles operations of the camera 804 and camera management operations, such as setting up camera parameters (e.g., frame rate, auto focus), and generating or otherwise capturing media data (e.g., image data of still images, image data of frames of a video). The image control software 803 and/or camera management software 807 initialize and control the hardware of the camera 804, which may include adjusting focus, exposure, and capturing images or video data, among other operations of the camera 804. The image control software 803 and/or the camera management software 807 of the operating system 802 may direct or instruct the camera's operations according to user preferences or user inputs, by translating the user preferences or inputs and operating system commands into specific actions performed by the camera 804.

The mobile application 801 interacts with the camera management software 807 and the image control software 803 of the operating system 802 to, for example, access the functionalities of the camera 804, process media data, and derive and analyze information about the media data. The operating system 802 provides APIs for accessing and controlling the image control software 803 and camera management software 807 that the mobile application 801 may invoke or use to interact with the camera 804. For instance, the mobile application 801 may use the APIs of the operating system 802 to invoke the camera management software 807 and instruct the camera 804 to, for example, take pictures, record videos, and apply filters or effects, among other functions. The mobile application 801 then uses the APIs of the operating system 802 to invoke the image control software 803 and perform the various forms of analysis on the media data (e.g., image data of still images, image data of frames of a video) generated or otherwise captured by the camera management software 807 using the camera 804.

The mobile application 801 may use the APIs or software libraries of the camera management software 807 to control the camera 804 and generate the media data, and then access the image control software 803 or camera management software 807 to generate various types of data or information about the captured media data. For example, the mobile application 801 can instruct the camera management software 807 to generate frames of a video data and then access the image control software 803 to request information that the image control software 803 (or camera management software 807) generated or extracted from the particular frame containing the image data, such as image feature vectors, annotations, luminance values, dimension values, among others.

The image control software 803 employs machine-learning models 805, which may include one or more neural network architecture, to perform various functions related to processing media data. These machine-learning models 805 are programmed and trained to recognize and extract features or information about the media data captured by the camera 804 of the client device 810. For instance, the image control software 803 executes the machine-learning models to identify document attributes of a document in an image, such as text, shapes, dimensions, and colors. The machine-learning models 805 of the image control software 803 may extract or generate feature vectors that represent the attributes or content of the document. These machine-learning models 805 includes layers or functions within the machine-learning architecture for analyzing the media data, such as de-skewing or reorienting the images, compressing the data, and applying visual transformations, among others. The image control software 803 or mobile application 801 can select specific frames from a video feed based on the quality or characteristics of the image data to feed to various operations of the mobile application 801. The image control software 803 uses the outputs of the machine-learning models 805 to generate various types of data values or data objects that may be ingested or otherwise access by the mobile application 801 via the one or more APIs and software libraries.

In some implementations, the machine-learning models 805 includes one or more convolutional neural networks (CNNs) for performing various operations of the image control software 803. The machine-learning models 805 include a CNN for feature extraction. The CNN may extract spatial features from the image data of a frame of a video feed, detect image gradients and edges using pixel data of the image data, identify the quadrilateral shapes of documents in the image, detect luminance quality, and other operations.

The image control software 803 may include specialized programming for performing precise edge detection and corner localization based upon the pixel data, which may be executed as layers integrated with the machine-learning models 805 or as post-processing operations of the machine-learning models 805. For instance, the CNN of the machine-learning models 805 or other programming of the image control software 803 validate that the detected shape is a quadrilateral with sharp and consistent edges, such that the image control software 803 determines the dimensions of the document using identified edges and corners of the document. The image control software 803 determines that the document is a rectangle in response to determining that the dimensions of the document form a rectangle in the image of the particular frame as selected from the video. The image control software 803 includes APIs or libraries that the mobile application 801 may query or otherwise interact with to request, for example, document object data, dimension data, rectangle detection data, or the like.

The machine-learning models 805 and the image control software 803 performs luminance analysis to determine whether the image of the document has sufficient contrast and brightness. The image control software 803 may compare the brightness of the document area with the surrounding background to confirm whether the document is clearly visible. In some cases, the image control software 803 may convert the pixels of the captured image to a grayscale representation. This process focuses on the luminance (brightness) information by removing color data, making it easier to detect edges and contrasts that indicate the presence of a document. The image control software 803 or machine-learning models 805 may generate and analyze a luminance histogram representing the pixel image intensity to determine a range and contrast of pixel greyscale of the image. By examining variations in luminance across the image, the image control software 803 can detect significant brightness changes that typically correspond to edges of the document or other objects in the image. Using the identified document edges, the image control software 803 may determine the boundaries of the document. The image control software 803 identifies pixels having strong luminance gradients or contrasts as likely document borders. The image control software 803 includes APIs or libraries that the mobile application 801 may query or otherwise interact with to request, for example, the document object data, the luminance values at pixels of the image, aspect ratio of the document relative to the image, dimension data, and rectangle detection data, among others.

The machine-learning models 805 and the image control software 803 may perform text recognition capabilities that can read text on the document. The image control software 803 may analyze the luminance and contrast of the image. Using the document detection capabilities, the image control software 803 determines the document boundaries. The machine-learning models 805 includes layers for one or more CNNs or RNNs, programmed and trained to detect and recognize text. The machine-learning models 805 are trained on a diverse set of document images, including checks, to learn the nuances of various fonts, handwritten styles, and printed characters. The image control software 803 includes APIs or libraries that the mobile application 801 may query or otherwise interact with to request, for example, the text identified in the image, or pixel regions of the document containing the text, among the other types of image-related information.

The client device 810 can include a mobile device. The client device 810 may include any electronic computing device comprising hardware and software components capable of performing the various processes and tasks described herein. Non-limiting examples of the client device 810 include laptops, desktops, and mobile computing devices (e.g., smart phones, tablets), among others. In some embodiments, the server 830 may be implemented in a virtualized environment or a dedicated physical server. In some embodiments, the client device 810 and the server 130 can be implemented on a same computing device. References to a processor can include one or more physical devices such as general-purpose arithmetic logic units or, analog circuity, function-specific digital circuity, or other processing apparatuses.

The client device 810 downloads, installs, and executes software programming of the mobile app 801, which includes processes for interacting with the image control software 803 and the operating system 802. The client device 810 may receive the media data (e.g., images data, video data) via the camera 804. The client device 110 includes or is coupled to one or more cameras 804 for capturing and generating videos and/or pictures. The mobile application 801 may instruct the image control software 803 and the camera 804 to capture the media data, such as video data and image data, where media data contains imagery of various types of documents, such as checks. For example, the image control software 803 and the camera 804 can include an autofocus, exposure adjustment, post-processor (e.g., image sharpener), or the like.

The client device 810 can generate an overlay for presentation via a display integral thereto, or otherwise coupled therewith. For example, the client device 810 can generate any of the displays depicted in FIGS. 4A-4E. The client device 810 can include a mobile application 801 having a mobile wallet that can include account or payment information, such as access to one or more accounts. The mobile application 801 can interface with accounts, to aid in the remote deposit of checks or other types of documents. The client device 810 can include one or more identifiers, (e.g., unique identifiers). The device identifiers may include identifiers of the mobile device, including telephone numbers, IMEI, MAC addresses, UUID, advertising identifiers, etc. The device identifiers may include identifiers of the mobile wallet, such as a wallet ID, account number, token, biometric data, etc. Any such information may be available to the server 830, via a network connection with the client device 810, or as received from a data repository 150 accessible to the server 830. Some data stored by the data repository 150 may be duplicative to information stored on the client device 810. Some data stored by the data repository 150 may otherwise correspond to information stored on the client device 810 (e.g., a corresponding key of an asymmetric key pair, a hash of biometric data, etc.). Accordingly, in some embodiments, the server 830 may verify an identity based on a comparison between information received from a client device 810 and corresponding information retrieved from the data repository 150.

The servers 830 (e.g., provider servers 112, server 130) can include third party or other remote data sources. For example, the server 830 can include an automated clearing house (ACH) or an addressable location for further entities. The entities can include financial institutions corresponding to data content of the document, such as according to a linkage between a routing number, address, or other source indicia of a check, and a linkage to the financial institutions stored in the data repository corresponding to such source indicia. Any networked components can exchange data with the server 830. For example, a server 830 can cause a check image (e.g., a composite check image) to be conveyed to initiate an ACH transaction for a deposit or settlement thereof. Likewise, networked components can receive data from the ACH or other servers 830. For example, in some embodiments, any of the information of the data repository 150 can be received from the server 830. In some embodiments, a server 830 can exchange data with the networked devices via off-line data transfer (such as to batch transfer image training data, location data, metadata, etc.).

Optionally, the system 800 includes an analytics database 140 including configuration of various mobile app machine-learning models (not shown) implemented by the mobile application 801 or the machine-learning models 805 of the image control software 803. In some implementations, the analytics database 140 can include prior or expected feature vectors (sometimes referred to as embeddings, without limiting effect) corresponding to image data of one or more frames. For example, the embeddings can encode image characteristics such as color, texture, or shapes. A feature vector may include indicia of a check type or source (e.g., logos, images, addresses, routing numbers, patterns, or so forth). Additional aspects of the analytics database 140 have been described in earlier figures and need not be repeated here.

Optionally, the system 800 includes a data repository 150 containing, for example, information about end-users or client devices 810 associated with end-users, and prior or expected feature vectors that correspond to images or other data captured in the document image information of media data. For example, such information can include field information (e.g., deposit amounts, sequential check numbers, or so forth) or other account such as location data or account history. The mobile application 801 or server 830 can employ the information of the analytics database 140 in combination with the data repository 150 to detect anomalous behavior. An identifier (e.g., unique identifier, account number, timestamp, etc.) can link image data or other information of the data repository 150 with a feature vector or other representation of the analytics database 140. In some embodiments, the data repository 150 can provide image data along with any associated transaction data, such as a transaction identifier, deposit amount, deposit account, etc. For example, the image data provided to the provider server 112 can include a representative image of a document, such as an image generated from one or more frames of the video feed. Likewise, as indicated above, such information can be incorporated in feature vectors including image data. Additional aspects of the analytics database 140 have been described in earlier figures and need not be repeated here.

Figure 9:
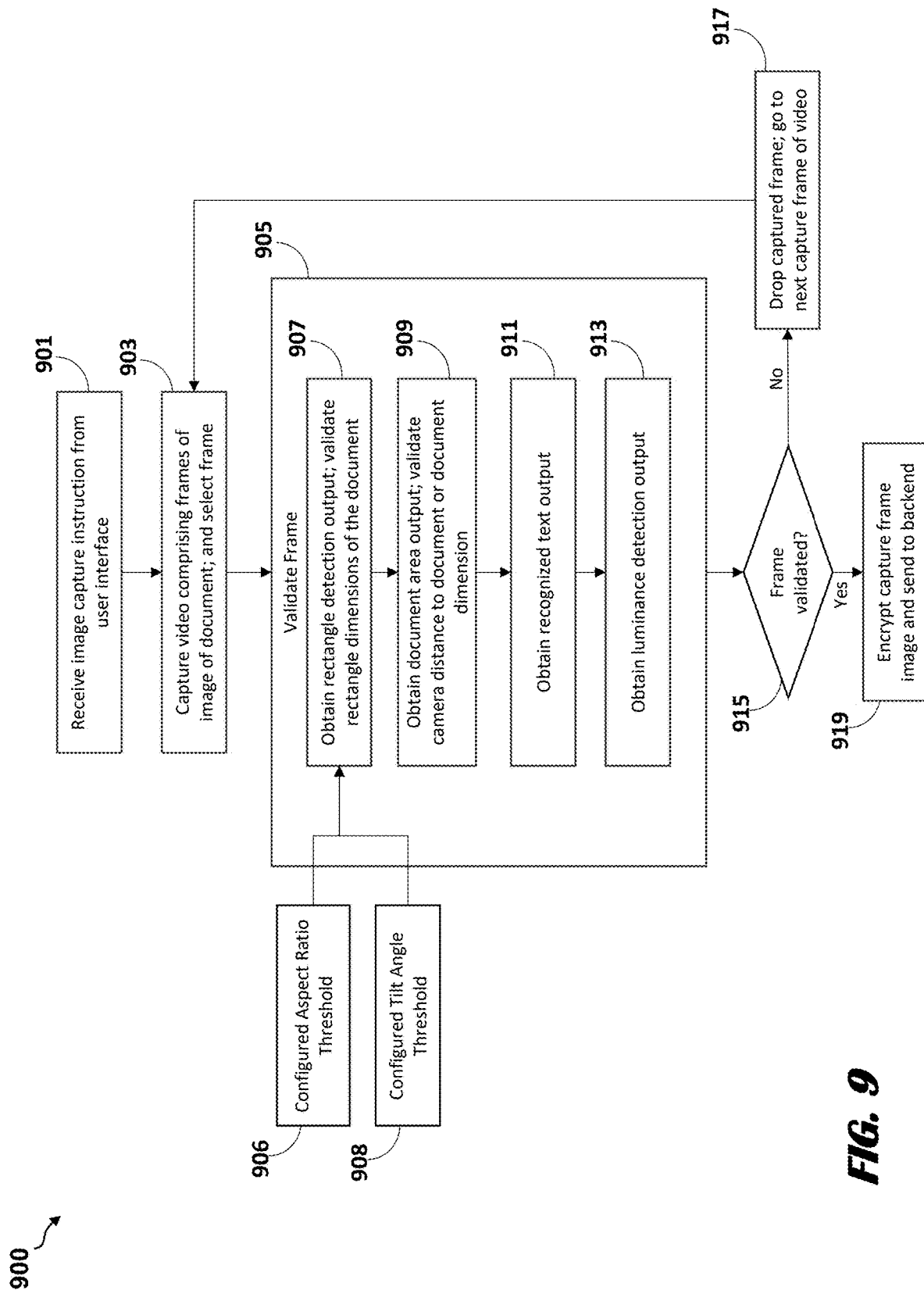
FIG. 9 is flowchart illustrating operations of a method for client-side validation for remote processing of document imagery, in accordance with some embodiments.

FIG. 9 is flowchart illustrating operations of a method 900 for client-side validation for remote processing of document imagery, in accordance with some embodiments. The method 900 includes operations performed by a client device 810 (e.g., client device 110) for locally validating a type of document included in image data intended for a remote computing device (e.g., backend servers, computing device 230, provider servers 112). The method 900 may include additional or fewer operations than shown. The operations shown may be performed in the order shown, in a different order, or concurrently. The details of certain operations have been previously described in earlier methods (e.g., method 500, method 600a-600b, 700a-700b) and are incorporated here and need not be repeated.

In operation 901, the mobile application 801 of the client device 810 receives an instruction, via an interactive user interface of the client device 810, to capture an image of a document.

In operation 903, the mobile application 801 invokes the camera management software 807 and a camera 804 of the client device 810, where the camera management software 807 instructs the camera 804 to generate and capture a video feed containing imagery of the document. The video feed comprises a plurality of frames, where each frame includes image data having an image of the document. The mobile application 801 obtains video data having multiple frames including imagery of a document of a document type.

At a predetermined interval of the video feed, the client device 810 selects a particular frame and executes one or more frame validation operations 905. The image control software 803 captures a preconfigured number of frames per second (e.g., about 30 frames per second) and the mobile application 801, and the mobile application 801 selects a predetermined frame (e.g., a middle frame, a 15th frame of 30 frames every second) for validation. In this way, the mobile application 801 selects a frame at a predetermined interval to execute the one or more frame validation operations 905.

In operation 905, the mobile application 801 feeds the selected frame of the video frame to the one or more frame validation operations 905 to validate the document presented in the image of the frame. In performing the one or more frame validation operations 905, the mobile application 801 transmits requests for certain information about the frame or the image to the image control software 803. The mobile application 801 the requests for the information may include one or more execution parameters, preconfigured in the mobile application 801 or the image control software 803. The mobile application 801 sends the one or more requests to the image control software 803 by invoking or executing the APIs or software libraries of the image control software 803. For instance, the mobile application 801 transmits requests or invokes the image control software 803 to return information that the mobile application 801 references to perform the one or more frame validation operations 905. The mobile application 801 obtains certain the various outputs from the image control software 803 related to the frame or image, which the mobile application 801 references to validate the document or image.

In operation 907, the mobile application 801 obtains a rectangle detection output from the image control software 803. The mobile application 801 may include a preconfigured aspect ratio parameter 906 and a preconfigured tilt angle tolerance parameter 908. The image control software 803 performs a rectangle detection operation on the captured video frame according to the preconfigured parameters, including the aspect ratio parameter 906 and the tilt angle tolerance parameter 908.

The image control software 803 executes machine-learning models 805 for performing rectangle detection of the document object in the image. This may include detecting boundaries or edges of the document to identify the document and determining a set of dimensions of the document. Based upon the dimensions of document object, the machine-learning models 805 determines that the document is rectangular. The rectangle detection operations of the image control software 803 may generate a rectangle detection output having various information, such as a rectangle detection indicator and dimensions of the document, among other types of information about the document or the image.

The aspect ratio parameter 906 is a threshold value that the mobile application 801 references to determine whether the detected rectangle in the image of the frame conforms to preconfigured expected dimensions of the document (e.g., check). The mobile application 801 determines whether the aspect ratio of the detected rectangle of the document satisfies the aspect ratio parameter 906. If the mobile application 801 determines that the dimensions of the detected document rectangle are outside of (or otherwise fail to satisfy) the aspect ratio parameter 906, then the mobile application 801 or image control software 803 rejects the rectangle detection. In this way, the mobile application 801 (or image control software 803) validates whether the dimensions of the document have the aspect ratio parameter 906 and dimensions or shape as expected for the type of document (e.g., check).

The tilt angle tolerance parameter 908 is a threshold value that the image control software 803 references to determine whether the camera 804 is parallel to the document when the frame is captured (e.g., camera 804 captured image of the document laid flat on a surface). Generally, a document's edges are 90 degrees, though the corners of a document could be, visually, more or less than 90 degrees when the camera 804 is titled. The mobile application 801 or image control software 803 determines whether the edges or corners of the detected rectangle of the document satisfies the tilt angle tolerance parameter 908, which may be plus or minus an amount of degrees from 90 degrees. As an example, the tilt angle tolerance parameter 908 may be 95 degrees and 85 degrees. If the mobile application 801 or image control software 803 determines that the dimensions of the detected document rectangle have corners that are outside of (or otherwise fail to satisfy) the tilt angle tolerance parameter 908, then the mobile application 801 or image control software 803 rejects the rectangle detection. In this way, the mobile application 801 (or image control software 803) validates that the camera 804 is relatively parallel to the document in the frame.

In operation 909, the mobile application 801 obtains a document area output information from the image control software 803 and validates the dimensions of the detected document relative to a preconfigured image frame dimension and/or a distance of the document based upon the document area output. The mobile application 801 references the dimension information generated by the image control software 803, such as the edges or dimensions of the document. The mobile application 801 then calculates the area of the document and then the area of the document relative to an area of the full camera image frame. The mobile application 801 determines whether the detected document occupies a significant portion (a threshold area value) of the image frame, indicative of the distance of the document from the camera 804 (e.g., neither too close nor too far from the camera 804). The mobile application 801 may be preconfigured with the camera frame dimensions of the camera 804, which the mobile application 801 references and compares against the document area. If the mobile application 801 or image control software 803 determines that the document area exceeds a threshold area value relative to the camera image frame, then the mobile application 801 or image control software 803 rejects the detected document and the frame. In this way, the mobile application 801 (or image control software 803) validates that the document is an adequate distance from the camera 804.

In operation 911, the mobile application 801 obtains recognized text output from the image control software 803 and validates the document based upon preconfigured expected text. The machine-learning models 805 includes one or more deep neural networks (DNNs), that identifies and detects portions of the image in which text occurs within the identified document, which may include detecting printed or handwritten characters. The machine-learning models 805 are trained and programmed to recognize patterns and layouts of text of on the type of document (e.g., checks), such as the check number, amount fields, and signature lines.

The image control software 803 generates and returns the recognized text output based upon the text identified by the image control software 803. The recognized text output may include, for example, a structured set of data that includes each detected text segment along with certain corresponding metadata. For an identified text region, the image control software 803 generates and returns information indicating the recognized characters and coordinates of a bounding box outlining the location of the characters on the document, among others. The mobile application 801 may validate the particular frame of the video when the recognized text satisfies a text similarity threshold to expected text of one or more predetermined templates.

In some embodiments, the image control software 803 recognizes content data of the recognized text and compares the content data of the document against a predefined template of content data expected for the document to validate the text and the content data of the document in the frame. For example, the predefined template can include the expected text and a format (e.g., number of characters, checksum, or other verification). In some embodiments, the mobile application 801 can compare a first portion of the content data against second portion of the content data. For example, the mobile application 801 can compare data content of a numerical amount field 314 (courtesy amount) against a written amount field 316 (formal amount), a routing number against another indication of a drawee bank, or an account number against a name according to data stored in a data repository 150.

Optionally, the mobile application 801 may determine whether the text indicates a front of the document or a back of the document. The image control software 803 executes the text recognition operations to read and analyze the text present on the document image of the frame, which includes recognizing text of various types of textual elements of the document, such as a check number, date, payee name, formal amount field, courtesy amount field, and endorsement field, among others. In some implementations, the machine-learning models 805 of the image control software 803 are trained and programmed to identify and classify the recognized text as the types of textual elements. Likewise, the machine-learning models 805 or the mobile application 801 may be programmed or trained to determine or classify the document image in the frame is a front image of the document or back image of the document based upon, for example, the recognized text, the identified textual elements, the position (e.g., pixel coordinates) of the textual elements within the recognized document of the image. The mobile application 801 may validate the particular frame of the video when the mobile application 801 is expecting a front image and the mobile application 801 determines that the particular frame contains an image of the front of the document. Likewise, the mobile application 801 may validate the particular frame of the video when the mobile application 801 is expecting a back image and the mobile application 801 determines that the particular frame contains an image of the back of the document. Otherwise, the mobile application 801 rejects the validation of that particular frame.

In operation 913, the mobile application 801 obtains a luminance detection output from the image control software 803 and validates the document based upon one or more brightness value thresholds. The machine-learning models 805 of the image control software 803 analyze the brightness and contrast of the captured image of the particular frame. The image control software 803 extracts one or more features or feature vectors for the pixels within the identified dimensions of the document or outside of the document (e.g., background portion of the image), where the features or feature vectors are indicative of, for example, certain luminance brightness values or comparative contrast brightness values. The image control software 803 or the mobile application 801 references the various types of brightness values to determine, for example, whether the pixels of the document satisfy a brightness threshold, and/or whether the comparative brightness values (e.g., brightness values of the background pixels compared against brightness values of the document pixels) satisfy a brightness contrast threshold. The mobile application 801 or image control software 803 may be preconfigured with the one or more brightness thresholds, which the mobile application 801 or image control software 803 references and compares against the various brightness values of the luminance detection output (e.g., pixel luminance values, pixel feature vectors, contrast values, brightness luminance values), as generated for the frame having the document image. If the mobile application 801 or image control software 803 determines that the values of the luminance detection output fail to satisfy the one or more corresponding brightness value thresholds, then the mobile application 801 or the image control software 803 rejects the detected document or the particular frame. In this way, the mobile application 801 (or image control software 803) validates, for example, whether the image was captured with adequate lighting or whether the background is too light or lacks contrast.

In decision operation 915, the mobile application 801 determines whether the particular, selected frame of the video data is validated or failed any of the one or more frame validation operations 905.

If the selected frame fails to satisfy any of the one or more frame validation operations 905, then the mobile application 801 moves on to operation 917. In operation 917, the mobile application 801 drops or deletes the current frame and moves a next selected frame at the next predetermined interval, as in operation 903. For example, the mobile application 801 obtains a next one-second interval of video data, comprising 30 frames of video, and the mobile application 801 selects a second frame (e.g., middle frame, 15th frame of the 30 frames) for the one or more frame validation operations 905.

If, in decision operation 915, the mobile application 801 determines that the selected frame satisfies the one or more frame validation operations 905, then the mobile application 801 moves on to operation 919.

In operation 919, the mobile application 801 encrypts the image of the current frame containing the document and transmits the encrypted image to a backend server. The mobile application 801 generates an output image representing the document having the content data based upon the content data on the document data. For example, the mobile application 801 can generate the output image (also referred to as a representative image, without limiting effect) based on the image data of the validated frame. The generation of the output image can include a comparison of image data to a quality threshold. For example, the comparison can determine legibility, sharpness, or other indicia of image quality. The comparison can include a comparison of image data as received from the frames, or manipulations thereof. For example, image data can be cropped, resized, denoised, compressed (e.g., features thereof), or otherwise manipulated. The mobile application 801 may encrypt and transmit the output image to the backend server.

Figure 10:
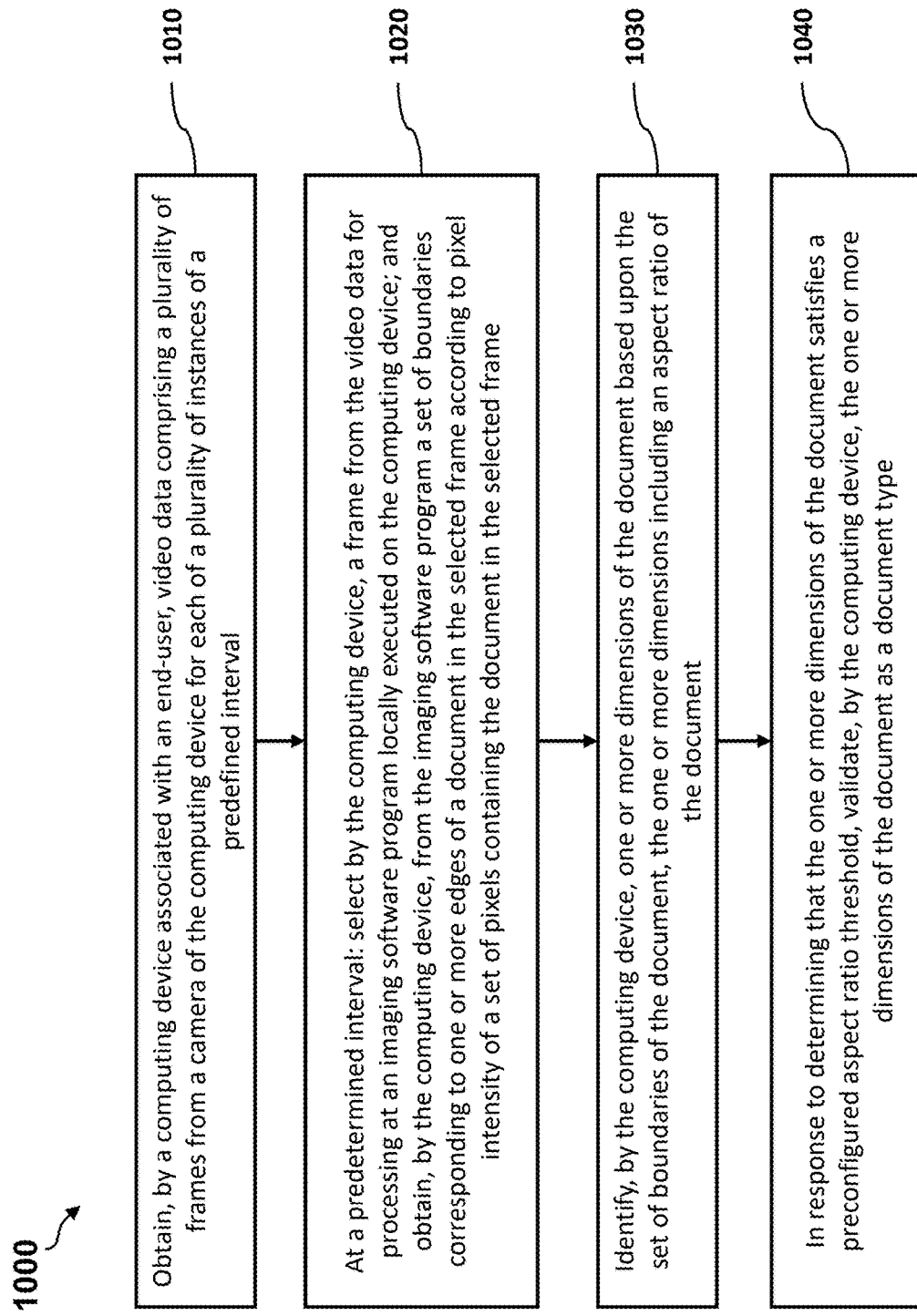
FIG. 10 is a flowchart of an example method for client-side processing and validation of document imagery, according to embodiments.

FIG. 10 is a flowchart of an example method 1000 for client-side processing and validation of document imagery, according to embodiments. The method 1000 includes operations performed by a client device 810 (e.g., client device 110) having locally executed mobile application 801 and image control software 803 for locally validating a type of document included in image data intended for a remote computing device (e.g., backend servers, computing device 230, provider servers 112). The method 1000 may include additional or fewer operations than shown. The operations shown may be performed in the order shown, in a different order, or concurrently. The details of certain operations have been previously described in earlier methods (e.g., method 500, 600*a*-600*b*, 700*a*-700*b*) and are incorporated here and need not be repeated.

At operation 1010, a computing device associated with an end-user obtains video data comprising a plurality of frames from a camera of the computing device. The computing device obtains video data continually, where the camera obtains a set of frames for a given time period (e.g., 30 frames per second).

At operation 1020, at a predetermined interval, the computing device selects a frame from the video data for processing at the imaging software program, which may be locally executed on the computing device. The predetermined interval may be one second, and the computing device selects a predetermined or arbitrary frame within the predetermined interval. For example, the computing device may select the 15th frame (or any other frame) from the 30 frames captured in a one-second time period of video data. The computing device may obtain, from the imaging software program, certain information about the image of the selected frame, such as a set of boundaries corresponding to one or more edges of a document in the selected frame according to pixel intensity of a set of pixels containing the document in the selected frame.

At operation 1030, the computing device identifies one or more dimensions of the document based upon the set of boundaries of the document. The one or more dimensions may include an aspect ratio of the document, indicating the aspect ratio of a vertical dimension and a horizontal dimension of the document.

At operation 1040, the computing device may determine whether the one or more dimensions of the document satisfy a preconfigured aspect ratio threshold. In response to computing device determining that the one or more dimensions of the document satisfy the preconfigured aspect ratio threshold, the computing device may validate the one or more dimensions of the document of the selected frame as a document type.

FIG. 11 is a flowchart of an example method 1100 for client-side processing and validation of document imagery. The method 1100 includes operations performed by a client device 810 (e.g., client device 110) having locally executed mobile application 801 and image control software 803 for locally validating a type of document included in image data intended for a remote computing device (e.g., backend servers, computing device 230, provider servers 112). The method 1100 may include additional or fewer operations than shown. The operations shown may be performed in the order shown, in a different order, or concurrently. The details of certain operations have been previously described in earlier methods (e.g., method 500, 600*a*-600*b*, 700*a*-700*b*) and are incorporated here and need not be repeated At operation 1110, a computing device associated with an end-user obtains video data comprising a plurality of frames from a camera of the computing device. The computing device obtains video data continually, where the camera obtains a set of frames for a given time period (e.g., 30 frames per second).

At operation 1120, at a predetermined interval, the computing device selects a frame from the video data for processing at the imaging software program, which may be locally executed on the computing device. The predetermined interval may be one second, and the computing device selects a predetermined or arbitrary frame within the predetermined interval. For example, the computing device may select the 15th frame (or any other frame) from the 30 frames captured in a one-second time period of video data. The computing device may obtain from the imaging software program a set of boundaries corresponding to one or more edges of a document in the selected frame according to pixel intensity of a set of pixels containing the document in the selected frame. The computing device may obtain, from the imaging software program, certain information about the image of the selected frame, such as one or more luminance values for the frame, including a document brightness value for the set of pixels containing the document.

At operation 1130, the computing device may determine a background brightness value for a background set of pixels outside the set of boundaries of the document. The computing device may also determine a contrast brightness value using the document brightness value and the background brightness value. For instance, the computing device may compare one or more document brightness values for the pixels of the document against one or more background brightness values for the pixels of the background.

At operation 1140, the computing device may determine whether the document brightness value satisfies a first luminance threshold, and whether the contrast brightness value satisfies a second luminance threshold. In response to determining that the document brightness value satisfies the first luminance threshold and that the contrast brightness value satisfies the second luminance threshold, the computing device may validate the document of the frame selected at the predetermined interval.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for client-side processing and validation of document imagery, the method comprising:
    obtaining, by a computing device associated with an end-user, video data comprising a plurality of frames from a camera of the computing device;
    selecting, by the computing device, a frame from a plurality of frames of the video data obtained during a predetermined interval for processing at an imaging software program locally executed on the computing device in response to a completion of the predetermined interval;
    obtaining, by the computing device from the imaging software program, a set of boundaries corresponding to one or more edges of a document in the selected frame according to pixel intensity of a set of pixels containing the document in the frame that was selected in response to the completion of the predetermined interval;
    identifying, by the computing device, one or more dimensions of the document based upon the set of boundaries of the document, the one or more dimensions including an aspect ratio of the document; and
    in response to determining that the one or more dimensions of the document satisfies a preconfigured aspect ratio threshold, validating, by the computing device, the one or more dimensions of the document as a document type.

2. The method of claim 1, wherein the computing device failed to validate a prior frame of the video data selected at a prior instance of the predetermined interval, and wherein the computing device selects the frame of the video data upon the completion of the predetermined interval in response to failing to validate the prior frame, wherein the completion of the predetermined interval is determined based on a temporal duration or a sequence number of the selected frame.

3. The method of claim 2, wherein the computing device continually captures the video data via the camera, and wherein the computing device interrupts until interrupting operation of the camera in response to validating the document of the selected frame.

4. The method of claim 1, further comprising:
    encrypting, by the computing device, the validated selected frame; and
    transmitting, by the computing device, the encrypted validated selected frame and mobile client device metadata to a backend server.

5. The method of claim 1, wherein computing device determines the aspect ratio for the document using a vertical value and a horizontal value of the one or more dimensions of the document.

6. The method of claim 5, wherein the aspect ratio threshold has an upper and lower aspect ratio bound for the document type of a check.

7. The method of claim 1, wherein the computing device determines an angle value of a corner of the document at an intersection of a pair of the boundaries corresponding to a vertical value and a horizontal value of the one or more dimensions, and wherein the computer validates the one or more dimensions of the document based upon the angle value of the corner satisfying an angle tolerance threshold.

8. The method of claim 1, wherein the computing device determines an area ratio between an area of portion of the image having the document and a total area of the selected frame and wherein the computer validates the document based upon the area ratio of the document satisfying a document area threshold.

9. The method of claim 1, further comprising:
    obtaining, by the computing device, from the imaging software program one or more luminance values for the frame, including a document brightness value for the set of pixels containing the document, wherein the computing device validates the document of the frame based upon the document brightness value satisfying a first luminance threshold.

10. The method of claim 9, further comprising:

determining, by the computing device, a background brightness value for a background set of pixels outside the set of boundaries of the document, and a contrast brightness value using the document brightness value and the background brightness value, wherein the computing device validates the document of the selected frame based upon the contrast brightness value satisfying a second luminance threshold.

11. A system comprising:

a computing device associated with an end-user comprising at least one processor, configured to:

obtain video data comprising a plurality of frames from a camera of the computing device for each of a plurality of instances of a predefined interval;

select a frame from a plurality of frames of the video data obtained during a predetermined interval for processing at an imaging software program locally executed on the computing device in response to a completion of the predetermined interval;

obtain from the imaging software program, a set of boundaries corresponding to one or more edges of a document in the selected frame according to pixel intensity of a set of pixels containing the document in the frame that was selected in response to the completion of the predetermined interval;

identify one or more dimensions of the document based upon the set of boundaries of the document, the one or more dimensions including an aspect ratio of the document; and in response to determining that the one or more dimensions of the document satisfies a preconfigured aspect ratio threshold, validate the one or more dimensions of the document as a document type.

12. The system of claim 11, wherein the computing device failed to validate a prior frame of the video data selected at a prior instance of the predetermined interval, and wherein the computing device selects the frame of the video data upon the completion of the predetermined interval in response to failing to validate the prior frame, wherein the completion of the predetermined interval is determined based on a temporal duration or a sequence number of the selected frame.

13. The system of claim 12, wherein the computing device is further configured to continually capture captures the video data via the camera, and wherein the computing device interrupts until interrupting operation of the camera in response to validating the document of the selected frame.

14. The system of claim 11, wherein the computing device is further configured to:

encrypt the validated selected frame; and transmit the encrypted validated selected frame and mobile client device metadata to a backend server.

15. The system of claim 11, wherein the computing device is further configured to determine the aspect ratio for the document using a vertical value and a horizontal value of the one or more dimensions of the document.

16. The system of claim 15, wherein the aspect ratio threshold has an upper and lower aspect ratio bound for the document type of a check.

17. The system of claim 11, wherein the computing device is further configured to determine an angle value of a corner of the document at an intersection of a pair of the boundaries corresponding to vertical and horizontal components of the dimensions, and wherein the computer validates the one or more dimensions of the document based upon the angle value of the corner satisfying an angle tolerance threshold.

18. The system of claim 11, wherein the computing device is further configured to determine an area ratio between an area of portion of the image having the document and a total area of the selected frame and wherein the computer validates the document based upon the area ratio of the document satisfying a document area threshold.

19. The system of claim 11, the computing device is further configured to:

obtain from the imaging software program one or more luminance values for the frame, including a document brightness value for the set of pixels containing the document, wherein the computing device validates the document of the frame based upon the document brightness value satisfying a first luminance threshold.

20. The system of claim 19, the computing device is further configured to determine a background brightness value for a background set of pixels outside the set of boundaries of the document, and a contrast brightness value using the document brightness value and the background brightness value, and wherein the computing device validates the document of the selected frame based upon the contrast brightness value satisfying a second luminance threshold.

* * * * *